United States Patent
Luthe et al.

(10) Patent No.: US 12,063,003 B2
(45) Date of Patent: Aug. 13, 2024

(54) DEVICE AND METHOD FOR PATH PLANNING FOR A MOVER OF A DRIVE DEVICE

(71) Applicant: Beckhoff Automation GmbH, Verl (DE)

(72) Inventors: Thomas Luthe, Verl (DE); Hubertus Pennekamp, Gütersloh (DE); Eva Wiedner, Hövelhof (DE); Tobias Weber, Verl (DE); Klaus Neumann, Gütersloh (DE); Alexander Weddemann, Lippstadt (DE)

(73) Assignee: Beckhoff Automation GmbH, Verl (DE)

( * ) Notice: Subject to any disclaimer, the term of this patent is extended or adjusted under 35 U.S.C. 154(b) by 513 days.

(21) Appl. No.: 17/325,664

(22) Filed: May 20, 2021

(65) Prior Publication Data

US 2021/0273593 A1    Sep. 2, 2021

Related U.S. Application Data

(63) Continuation of application No. PCT/EP2019/082536, filed on Nov. 26, 2019.

(30) Foreign Application Priority Data

Nov. 26, 2018  (DE) ..................... 10 2018 129 738.6

(51) Int. Cl.
*H02K 16/02* (2006.01)
*G05B 19/4061* (2006.01)
(Continued)

(52) U.S. Cl.
CPC ......... *H02P 25/064* (2016.02); *H02K 41/031* (2013.01); *H02K 2201/18* (2013.01)

(58) Field of Classification Search
CPC . H02K 41/031; H02K 2201/18; H02P 25/064
See application file for complete search history.

(56) References Cited

U.S. PATENT DOCUMENTS 6,097,114 A    8/2000  Hazelton
6,316,849 B1  11/2001  Trumper et al.
(Continued)

FOREIGN PATENT DOCUMENTS

CN        1330807 A    1/2002
CN      101537932 A    9/2009
(Continued)

OTHER PUBLICATIONS

Enze, Jiang et al. "Analysis of Current Distribution for Permanent Magnet Synchronous Planar Motors," Proceedings of the CSEE, vol. 31, No. 9, Mar. 25, 2011, 5 pages.
(Continued)

*Primary Examiner* — Gabriel Agared
(74) *Attorney, Agent, or Firm* — Dorsey & Whitney LLP

(57) ABSTRACT

A method for driving at least one mover is specified, wherein the mover comprises at least a second magnetic field generator, wherein the mover is movable on a drive surface comprising a plurality of sectors, wherein the sectors comprise magnetic field generators for generating at least one magnetic field, wherein path planning is carried out for the mover from a starting point to a target point on the drive surface, wherein at least one graph with nodes and edges is used for the path planning, wherein a path for the mover is determined on the basis of the graph.

20 Claims, 11 Drawing Sheets

(51) Int. Cl.
*H02K 41/03* (2006.01)
*H02P 25/064* (2016.01)

(56) References Cited

U.S. PATENT DOCUMENTS

| | | |
|---|---|---|
| 6,339,266 B1 | 1/2002 | Tanaka |
| 6,417,914 B1 | 7/2002 | Li |
| 6,835,941 B1 | 12/2004 | Tanaka |
| 7,339,289 B2 | 3/2008 | Wang et al. |
| 8,281,888 B2 | 10/2012 | Bergmann |
| 9,187,268 B2 | 11/2015 | Denninger et al. |
| 9,202,719 B2 | 12/2015 | Lu et al. |
| 9,701,487 B2 | 7/2017 | Unterseher |
| 10,222,237 B2 | 3/2019 | Lu |
| 10,352,953 B2* | 7/2019 | Huber .................... B65G 43/00 |
| 10,370,195 B2 | 8/2019 | Huber |
| 10,509,049 B2 | 12/2019 | Sinz et al. |
| 10,669,049 B2 | 6/2020 | Eberhardt et al. |
| 10,763,733 B2 | 9/2020 | Lu |
| 11,855,557 B2 | 12/2023 | Luthe et al. |
| 2005/0107909 A1 | 5/2005 | Wynblatt et al. |
| 2008/0051984 A1 | 2/2008 | Wurman et al. |
| 2011/0093134 A1 | 4/2011 | Emanuel et al. |
| 2017/0163140 A1* | 6/2017 | Lu ........................ H02K 41/031 |
| 2017/0179805 A1* | 6/2017 | Lu ............................ H02P 8/00 |
| 2017/0179806 A1* | 6/2017 | Lu .......................... H02N 15/00 |
| 2017/0217460 A1 | 8/2017 | Huber et al. |
| 2017/0344009 A1 | 11/2017 | Wernersbach |
| 2017/0361731 A1* | 12/2017 | Cromheecke .......... B61B 13/12 |
| 2018/0102681 A1* | 4/2018 | Prüssmeier ............. H01F 6/006 |
| 2018/0217174 A1 | 8/2018 | Malinowski |
| 2018/0373255 A1* | 12/2018 | Wernersbach ....... G05D 1/0212 |
| 2020/0223645 A1 | 7/2020 | Feyrer |
| 2021/0273592 A1 | 9/2021 | Luthe et al. |
| 2021/0278863 A1 | 9/2021 | Luthe et al. |
| 2021/0281203 A1 | 9/2021 | Luthe et al. |
| 2021/0328493 A1 | 10/2021 | Luthe et al. |

FOREIGN PATENT DOCUMENTS

| | | |
|---|---|---|
| CN | 101779368 A | 7/2010 |
| CN | 103135640 A | 6/2013 |
| CN | 103891114 A | 6/2014 |
| CN | 104094507 A | 10/2014 |
| CN | 105307960 A | 2/2016 |
| CN | 105452812 A | 3/2016 |
| CN | 105600469 A | 5/2016 |
| CN | 106168627 A | 11/2016 |
| CN | 106716141 A | 5/2017 |
| CN | 107852082 A | 3/2018 |
| DE | 102009008529 A1 | 9/2010 |
| DE | 102006007623 B4 | 6/2015 |
| DE | 102015209610 A1 | 12/2016 |
| DE | 102017131304 A1 | 6/2019 |
| DE | 102017131314 A1 | 6/2019 |
| DE | 102017131321 A1 | 6/2019 |
| DE | 102018129727 A1 | 5/2020 |
| DE | 102018129731 A1 | 5/2020 |
| DE | 102018129732 A1 | 5/2020 |
| DE | 102018129738 A1 | 5/2020 |
| DE | 102018129739 A1 | 5/2020 |
| EP | 2047376 B1 | 8/2015 |
| EP | 3095739 A1 | 11/2016 |
| EP | 3096144 A1 | 11/2016 |
| EP | 3385803 A1 | 10/2018 |
| EP | 3868005 B1 | 6/2022 |
| JP | H03112393 A | 5/1991 |
| JP | 2000125536 A | 4/2000 |
| WO | 2013059934 A1 | 5/2013 |
| WO | 2013064656 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2016012157 A1 | 1/2016 |
| WO | 2016012160 A1 | 1/2016 |
| WO | 2016012171 A1 | 1/2016 |
| WO | 2017004716 A1 | 1/2017 |
| WO | 2018176137 A1 | 10/2018 |
| WO | 2019170488 A1 | 9/2019 |
| WO | 2020109168 A1 | 6/2020 |
| WO | 2020109180 A1 | 6/2020 |
| WO | 2020109274 A1 | 6/2020 |
| WO | 2020109276 A1 | 6/2020 |
| WO | 2020109287 A1 | 6/2020 |

OTHER PUBLICATIONS

Kim, Won-jong et al. "Modeling and Vector Control of Planar Magnetic Levitator," IEEE, vol. 34, No. 6, Nov. 1998, 9 pages.
Office Action dated Nov. 29, 2021 in connection with Chinese Patent Application No. 201980077558.3, 10 pages Including English translation.
"Flying Motion: XPlanar," Beckhoff New Automation Technology, Nov. 1, 2018, Seiten 1-28. https://www.beckhoff.com/media/downloads/informationsmedien/beckhoff_xplanar_e.pdf.
International Search Report and Written Opinion in connection with PCT/EP2019/082536 dated Jun. 4, 2020, 25 pages including English translation.
International Search Report and Written Opinion dated Jun. 4, 2020 in connection with International Patent Application No. PCT/EP2019/082298, 25 pages including English translation.
International Search Report and Written Opinion dated Jun. 4, 2020 in connection with International Patent Application No. PCT/EP2019/082515, 29 pages including English translation.
International Search Report and Written Opinion dated Jun. 4, 2020 in connection with International Patent Application No. PCT/EP2019/082518, 25 pages including English translation.
International Search Report and Written Opinion dated Jun. 4, 2021 in connection with International Patent Application No. PCT/EP2019/082257, 25 pages including English translation.
Amato et al. "A Randomized Roadmap Method for Path and Manipulation Planning," IEEE, Apr. 1996, 8 pages.
Bortoff, Scott A. "Path Planning for UAVs" Proceedings of hte American Control Conference, Jun. 2000, 5 pages.
Bounini et al. "Modified Artificial Potential Field Method for Online Path Planning Applications," IEEE Intelligent Vehicles Symposium, Jun. 11, 2017, 7 pages.
Carbone et al. "Motion and Operation Planning of Robotic Systems: Background and Practical Approaches," Jan. 2015, 42 pages.
Correll, Nikolaus. "Introduction to Autonomous Robots," V1.7, Oct. 6, 2016, 10 pages.
Gasparetto et al. "Path Planning and Trajectory Planning Algorithms: A General Overview," 2015, 26 pages.
Gayle, et al. "Reactive deformation roadmaps: motion planning of multiple robots in dynamic environments." Proceedings of the 2007 IEEE/RSJ International Conference on Intelligent Robots and Systems, Oct. 29-Nov. 2, 2007, S. 3777-3787.
Kavraki et al. "Probabilistic Roadmaps for Path Planning in High-Dimensional Configuration Spaces," IEEE, vol. 12, No. 4, Aug. 1996, 15 pages.
Kim, et al. "Probabilistic Vehicle Trajectory Prediction over 1 Recurrent Neural Network," arxiv.org, Cornell University Library, 201 Olin Library Cor 14853, Apr. 24, 2017.
Le-Anh, et al. "A review of design and control of automated guided vehicle systems," European Journal of Operational Research, 171 (2006), pp. 1-23.
Nieuwenhuisen et al. "Local Multiresolution Path Planning in Soccer Games Based on Projected Intentions," Mar. 2012, 32 pages.
Padilla Cataneda et al. "Local Autonomous Robot Navigation using Potential Fields," Jun. 1, 2008, 25 pages.
Petereit et al. "Application of Hybrid A* to an Autonomous Mobile Robot for Path Planning in Unstructured Outdoor Environments," 2012.
Röfer et al. RoboCup 2011: Robot Soccer World Cup XV, Mar. 2012, 24 pages.

(56) References Cited

OTHER PUBLICATIONS

Tommasino et al. "Feel the Painting': a Clinician-Friendly Approach to Programming Planar Force Fields for Haptic Devices," IEEE, 2015, 6 pages.
Trumper et al. "Design and Analysis Framework for Linear Permanent Magnet Machines," IEEE, 1994, 8 pages.
Velagapudi et al. "Decentralized prioritized planning in large multirobot teams," 2010 IEEE/RSJ International Conference on Intelligent Robots and Systems, Oct. 18, 2010, 7 pages.
Warren, Charles. "Multiple Robot Path Coordination Using Artificial Potential Fields," IEEE Conference on Robotics and Automation, May 13, 1990, 8 pages.
Zhang et al. "Probabilistic Roadmap with Self-learning for Path Planning of a Mobile Robot in a Dynamic and Unstructured Environment," IEEE, Aug. 4, 2013, 6 pages.
Notification of an Objection received in connection with European patent application No. 19817165.4, dated Mar. 7, 2023, 41 pages including English translation.
Office Action dated Jan. 6, 2022 in connection with Chinese patent application No. 201980077654.5, 7 pages Including English translation.
Office Action dated Dec. 24, 2021 in connection with Chinese patent application No. 201980077844.7, 10 pages Including English translation.
Office Action dated Dec. 14, 2021 in connection with Chinese patent application No. 201980077609X, 19 pages including English translation.
Translation of Chinese Publication No. CN103135640A.

* cited by examiner

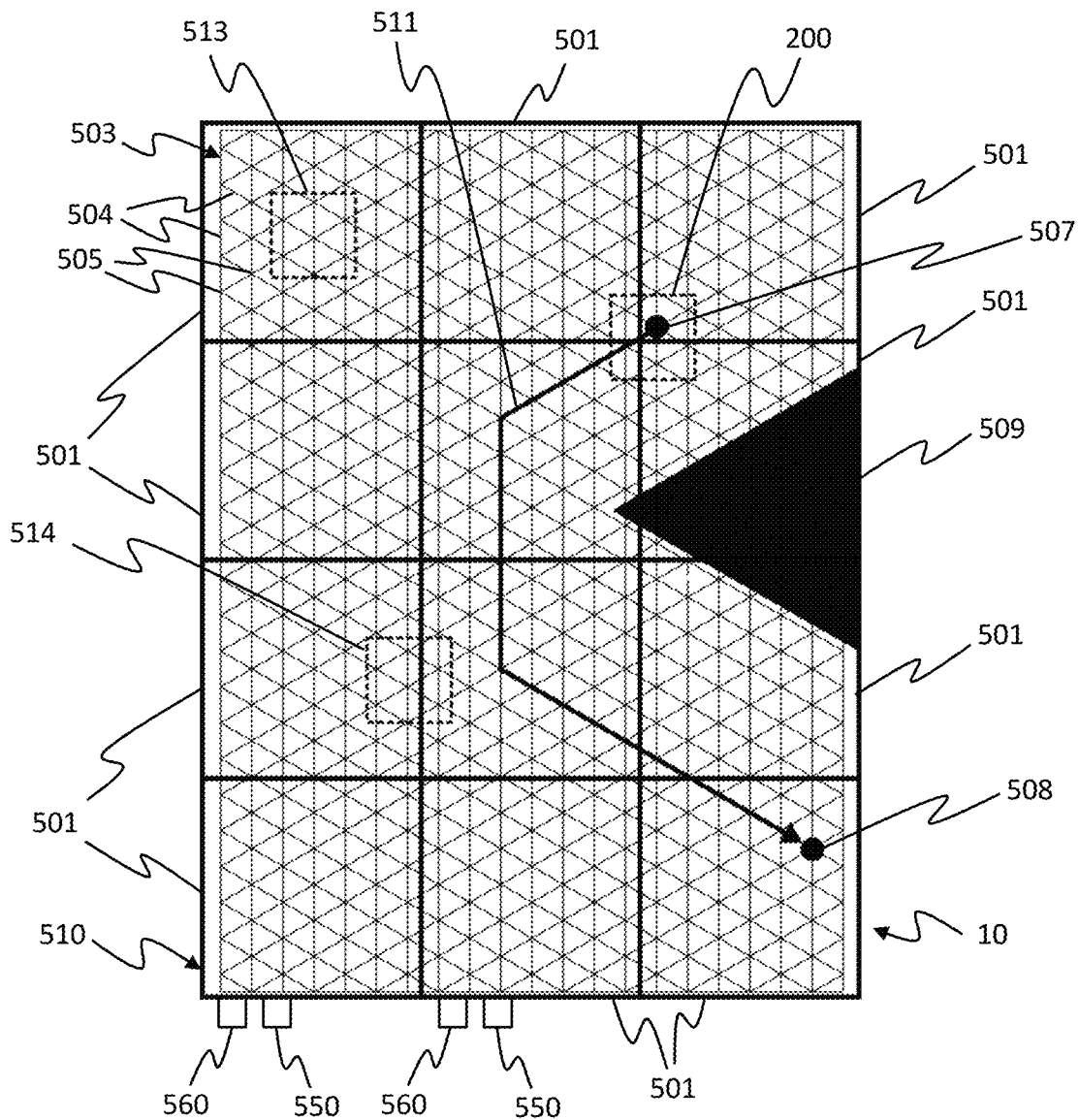
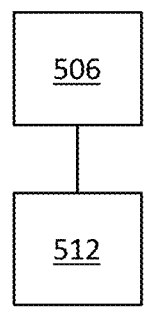
Fig. 7

DEVICE AND METHOD FOR PATH PLANNING FOR A MOVER OF A DRIVE DEVICE

CROSS-REFERENCE TO RELATED APPLICATIONS

This application is a continuation of International Patent Application PCT/EP2019/082536, filed 26 Nov. 2019, "Device and Method for Path Planning for a Mover of a Drive Device", which claims priority to German patent application DE 10 2018 129 738.6, filed 26 Nov. 2018, "Vorrichtung und Verfahren für eine Pfadplanung für einen Mover einer Antriebsvorrichtung", each of which is incorporated by reference herein, in the entirety and for all purposes.

FIELD

The present invention relates to a device and method for path planning for a mover of a drive device.

BACKGROUND

Planar drive systems may, inter alia, be used in automation technology, in particular in manufacturing technology, handling technology and process engineering. With planar drive systems, a movable element, a so-called mover, of a system of a machine may be moved or positioned in at least two linearly independent directions. Planar drive systems may comprise a permanently energized electromagnetic planar motor with a planar stator and a rotor, i.e. the mover, movable on the stator in at least two directions.

In a permanently energized electromagnetic planar motor, a driving force is exerted on the mover by current-carrying conductors magnetically interacting with driving magnets of a magnet arrangement. The present invention relates in particular to embodiments of planar drive devices in which the drive magnets of an electric planar motor are arranged on the mover and the current-carrying conductors of the planar motor are arranged in a stationary drive surface.

EP 3 095 739 A1 discloses a device for driving at least one mover on a drive surface, wherein travel paths are calculated in the form of paths for the movers. In this context, path planning is relatively complex.

SUMMARY

The present invention provides an improved device and method for path planning of a mover on a drive device.

According to one aspect, a device drives at least one mover on a drive surface, the mover comprising at least a second magnetic field generator, wherein the drive surface comprises a plurality of plate-shaped sectors, the sectors comprising magnetic field generators, the sectors being connected to a control unit, wherein the control unit is configured to generate magnetic fields via a corresponding control of a power supply of the magnetic field generators in such a way that the mover is movable in at least one direction over the drive surface, the control unit being embodied to carry out path planning for the mover, the control unit being embodied to use at least one graph with nodes and edges for the path planning, the control unit being embodied to use the graph to generate a path for the mover from a starting point to a target point, the control unit being embodied to actuate the magnetic field generators with current in such a way that the mover may be moved over the drive surface along the determined path.

According to another aspect, a device drives at least one mover on a drive surface, the mover comprising at least a second magnetic field generator, wherein the drive surface comprises a plurality of plate-shaped sectors, the sectors comprising magnetic field generators, the sectors being connected to a control unit, wherein the control unit is configured to generate magnetic fields via a corresponding control of a power supply of the magnetic field generators of the sectors in such a way that the mover is movable in at least one direction over the drive surface, the control unit being embodied to carry out path planning for the mover from a starting point to a target point, the control unit being embodied to actuate the magnetic field generators of the sectors with current in such a way that the mover may be moved over the drive surface along the determined path, wherein the control unit is embodied to use at least one graph having nodes and edges for path planning, wherein in a predetermined surrounding area around the position of the mover the graph has a higher density of edges and/or a higher density of nodes and/or a smaller mean length of the edges than outside of the surrounding area.

According to another aspect, a method drives at least one mover, wherein the mover comprises at least one device for generating a magnetic field, in particular at least one magnet, wherein the mover may be moved on a drive surface having a plurality of sectors, wherein the sectors have magnetic field generators for generating at least one magnetic field, wherein path planning for the mover is carried out from a starting point to a target point on the drive surface, wherein at least one graph having nodes and edges is used for path planning, wherein in a predetermined surrounding area around the position of the mover the graph has a higher density of edges and/or a higher density of nodes and/or a smaller mean length of the edges than outside of the surrounding area.

EXAMPLES

A device for driving at least one mover on a drive surface is proposed. The mover comprises at least one second magnetic field generator, in particular a magnet. The drive surface has a plurality of plate-shaped sectors. The sectors comprise magnetic field generators which serve to generate magnetic fields. A control unit is provided which is connected to the sectors. The control unit is embodied to generate magnetic fields via a corresponding control of a power supply of the magnetic field generators in such a way that the mover may be moved over the drive surface in at least one direction. In addition, the control unit is embodied to perform path planning for a path along which the mover is to be moved. For path planning, the control unit uses a rasterization of the drive surface in the form of a graph with nodes and edges. The control unit uses the graph to determine a path for the mover from a starting point to a target point. In addition, the control unit is embodied to drive the magnetic field generators with current in such a way that the mover may be moved along the determined path over the drive surface. By using the graph with edges and nodes, path planning is simplified. This allows the use of already existing efficient algorithms. There are various approaches for path planning on the basis of the graph. For example, the path may be planned at least partially or completely based on the edges of the graph. In addition, weights of edges may be considered in the path planning, e.g. minimizing the sum of the weights of the edges for the entire path. In another embodiment, the path need not follow the edges exactly. For example, the path may deviate from the edges and nodes in the interest of a better resulting path. A path may be planned along the edges in a first step, with the path being smoothed in a second step, e.g. to avoid too strong direction changes at the nodes. Furthermore, a hybrid algorithm may be used which follows the graph, but determines a path that does not have to lie on the edges and nodes.

Depending on the chosen embodiment, the path of the mover need not be precisely limited to the edges of the graph. For example, deviations from the edges may be allowed, especially in the region of the nodes, to allow for improved planning of the path.

In a further embodiment of the device, a weighting is assigned to at least one edge, in particular to at least a part of the edges. The weighting determines how advantageous or disadvantageous a path over the node or edge is for a predetermined optimization. The weighting is taken into account by the control unit during path planning in order to determine an optimized path for the movement of the mover according to a predetermined strategy. For example, a high weighting may be avoided during path planning. Thus, edges that are more suitable for path planning than other edges may be given a corresponding high or low weighting. By using edges with weights, a path of a mover from a starting point to a target point may easily be determined according to a predetermined strategy. The strategy may e.g. consist of avoiding edges with large or small weightings. In addition, the path planning strategy may consist in ensuring that a sum of the weightings of the edges that lie on the determined path of the mover does not exceed a predetermined threshold, or that the sum of the weightings of the edges of the determined path has a minimum value for the various possible paths between the starting point and the target point.

In a further development of the device, the weighting of an edge depends on the length of the edge or on a maximum speed and/or a maximum acceleration of the mover. The shorter an edge is, for example, the better the weighting of the edge is. The faster a mover may be moved on the edge, for example, the better the weighting of the edge. The graph may have edges of different lengths. In principle, it may be advantageous to determine the shortest possible path between the starting point and the target point. Thus, it is advantageous to use edges for planning the path that have the shortest possible length. With the shortest possible edges, the shortest possible path from the starting point to the target point may be determined. Furthermore, a maximum speed of the mover when traveling along the edge may be a parameter that influences the time it takes the mover to get from the starting point to the target point. Thus, edges that allow the mover to travel at the highest possible speed are preferred during path planning. Both the length of the path and the amount of time it takes for the mover to travel along the path from the starting point to the target point are significant factors that should be considered in path planning.

In a further embodiment of the device, the weighting of an edge depends on a temperature of the sector. In particular, the weighting of an edge may depend on a temperature of a magnetic field generator of the sector. When the magnetic field generator is energized, dissipated heat is generated that heats up the sector. Excessively high temperatures may negatively affect both the magnetic field generator and other components of the sector. Furthermore, it may be advantageous to avoid predetermined maximum temperatures in the sector. Thus, under certain conditions it may be advantageous not to select a shortest path or a fastest path, but to avoid sectors during path planning that have already exceeded a predetermined temperature or where there is a risk that a limit temperature will be exceeded if the magnetic field generator of the sector is energized further.

In a further embodiment of the device, the weighting may depend on further parameters of the sectors and/or of the mover, which support an advantageous path planning. For example, the weighting may depend on a speed of the mover, a maximum possible acceleration of the mover or a temperature of the sectors.

In a further development of the device, the control unit is embodied to use a graph for path planning, which has a different density of edges and/or a different density of nodes depending on a distance to a position of the mover. As the density of nodes increases, the average length of the edges may decrease. Furthermore, the density of nodes and/or edges of a graph may be increased in the vicinity of obstacles. Further, the average length of edges may be smaller in the region of an obstacle. Using the more accurate graph, a path in the region of obstacles may be planned more precisely. In particular, using a more accurate graph, e.g. a path may be planned more optimally through a narrow gap between two obstacles. The graph with the different densities of edges and/or nodes and with different mean lengths of edges may be stored in memory in the form of multiple subgraphs. Furthermore, the graph with the different densities of edges and/or nodes may be generated by the control unit from a given graph by an appropriate reduction of edges and nodes. In this process, the edges and nodes may be selected either according to geometric specifications or depending on parameters such as a shortest possible path planning or a fastest possible path planning. In addition, the edges and/or nodes of the graph may be provided with predetermined priorities that determine which edges and nodes are part of the graph to be used at a low density and which edges and nodes are part of the graph to be used at a high density.

In a further embodiment of the device, the control unit is embodied to use a graph in path planning that has a greater density of edges and/or a greater density of nodes in a predetermined surrounding area around the position of the mover than in an area outside of the predetermined surrounding area. Thus, by specifying the surrounding area, the accuracy of the graph relative to the position of the mover may be specified with different densities of edges and/or nodes. In a simple embodiment, the surrounding area may be in the form of a circular area at the center of which the mover is located. However, other shapes for defining the surrounding area are possible, as well. In addition, the specified surrounding area may depend on other parameters such as the speed of the mover and/or the distance to the target point. For example, if the speed of the mover is greater, a larger surrounding area may be specified than if the speed of the mover is less. In addition, e.g. a larger surrounding area may be selected when the distance to the target point is larger than when the distance to the target point is smaller. Fixed limit values may be used for evaluating the larger or smaller speed or for evaluating the larger or smaller distance to the target point. If the speed of the mover is above the specified speed limit, a high speed of the mover is detected and the surrounding area is set accordingly. If the distance of the mover to the target point is above the specified distance limit value, a large distance of the mover to the target point is detected and the surrounding area is defined accordingly.

In a further embodiment of the device, the control unit is embodied to use a graph for path planning that has a smaller density of edges and/or a smaller density of nodes with increasing distance from the position of the mover. Thus, depending on the distance to the mover, the accuracy of the graph, i.e. the density of edges and/or nodes, may be reduced. Due to the consideration of the distance, a continuous change of the accuracy of the graph may be achieved.

The use of a graph with a different level of accuracy or a different density of edges and/or nodes offers the advantage that a more precise planning of the path is possible in a closer surrounding area of the mover. This is particularly advantageous if the path planning is repeated at predetermined time intervals or according to predetermined distances traveled. In this way, near-field planning is performed that is accurate and enables a desired optimization of the path. Far-field planning, on the other hand, is performed imprecisely and more roughly, thus saving computing time and also allowing the entire path from the starting point or from the current position of the mover to the target point to be determined more quickly.

In a further embodiment of the device, the control unit is embodied to perform path planning in predefinable time cycles. For example, a time cycle may be in the range from 100 µs to 400 µs. This means that the path planning is repeated repeatedly in each case after a time range of 100 µs to 400 µs. In addition, a time cycle may also be in the range of 1 ms.

The weighting of the edges may also depend on whether a static or a moving obstacle is located at least partially in an area of the drive surface over which the edge passes. A static obstacle may e.g. be an object that is arranged on the drive surface and does not move. A moving obstacle may be an object moving on the drive surface, in particular another mover. This makes it possible, on the one hand, to avoid collisions and, on the other hand, to reduce or avoid deceleration processes and/or acceleration processes, which cost time on the one hand and energy for controlling the magnetic field generators on the other hand.

In another embodiment, the predetermined surrounding area may depend on the speed of the mover, e.g. may relate to a radial surrounding area around the mover that the mover travels at the current speed within a predetermined time range. For example, the time range may comprise 1 to 10 time cycles, with path planning being performed repeatedly by the control unit in each time cycle.

In a further embodiment, the control unit is embodied to execute the path planning in two planning levels. In a first planning level, a first path planning with a first graph is carried out and a first path for the movement of the mover is determined. In addition, in a second planning level, the control unit determines a second path planning with a second graph. In the second path planning, a second path for the movement of the mover is determined. The first graph has a smaller density of nodes and/or edges than the second graph. Furthermore, the control unit is embodied to consider both path planning procedures for the path planning of the mover. Thus, with the help of the first path planning, a more imprecise planning of the path for the mover may be achieved. The first path planning may e.g. be used to determine an inaccurate first path from the position of the mover to the target point. In addition, the second path planning may be used to determine a second path with a higher accuracy and thus a more optimized path for a predefinable surrounding area of the mover.

In another embodiment, the first graph and the second graph do not have shared nodes. In this embodiment, a target is selected for the second graph according to predetermined rules. For example, the node of the second graph that is closest to the last node of the first graph in the expansion range of the second graph is selected as the target.

In a further embodiment, the first graph and the second graph are connected to each other by at least one shared node. The shared node is considered by the control unit. For example, the shared node located on a determined first path may at least be used as an intermediate target for second path planning. In an embodiment, a plurality of shared nodes are provided between the first graph and the second graph. A shared node between the first graph and the second graph is a node provided in both the first graph and the second graph. In addition, a first path may be determined on which a plurality of shared nodes are located. The shared nodes of the first path are considered as intermediate targets by the second path planning. In this way, an optimized method with a relatively optimized path planning and a limited computation time may be provided.

Depending on the chosen embodiment, a nearest shared node located on the first path is used as an intermediate target for the second path planning. A nearest node is understood to be a node that is either closest in terms of path distance via edges of the second graph, or it is understood to be a shared node that may be reached as quickly as possible by the mover based on the edges of the second graph. In addition, further parameters for defining the closest node may be stored.

In a further embodiment of the device, the control unit is embodied to first calculate the first path planning from the starting point or from the current position of the mover to the target point and then to take the determined first path into account in the calculation of the second path planning. Thus, the second path planning may consider shared nodes that lie on the first path as intermediate targets for the second path planning. For the precalculation, however, it is not necessary that the first path planning from the current position of the mover to the target point is completely calculated first, but it is sufficient if the first path planning is clearly completed up to a predeterminable distance from the mover before the second path planning is executed for this area.

In a further development of the device, the control unit is embodied to perform dynamic planning for the mover on the basis of the planned path in order to address the magnetic field generators accordingly. For this purpose, the path may e.g. not lie completely on the edges, but be rounded off e.g. at the corners in order to enable a higher speed. Thus, at least in sections, a path for the mover is first calculated and then, based on the present path, the speed and the acceleration of the mover along the path are determined. For calculating the speed and the acceleration of the mover along the planned path, further parameters such as a loading of the mover, a predetermined range for an acceleration or deceleration of the mover, a predetermined permitted maximum acceleration of the mover, or the presence of a plurality of further movers moving or located in a predetermined surrounding area of the mover may be taken into account.

A method for driving at least one mover is proposed, wherein path planning for the mover is carried out from a starting point to a target point. Both the starting point and the target point may change during movement of the mover. In particular, the starting point may be considered to be a current position of the mover. In path planning, a graph with nodes and edges is used. Based on the graph, a path for the mover from starting point to target point is determined. Path planning may take place on the edges and nodes and/or within the grid of meshes between the edges and nodes, depending on the chosen embodiment. For example, a diagonal traversal of a mesh from node to node or a centered traversal between edges and nodes may also represent an optimal path. Using the graph simplifies the search for a path from the starting point to the target point based on the predetermined edges and nodes of the graph. This simplifies and speeds up calculation. After the path has been determined, the magnetic field generators are actuated in such a way that the mover may be moved along the determined path over the drive surface. Determining the path and controlling the path may e.g. be carried out by different control units.

A control unit is provided which is embodied to execute the described method.

In addition, a computer program is provided having instructions that, when run on a computer, perform the described method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 shows a schematic depiction of a drive surface with a graph and a control unit;

DETAILED DESCRIPTION

The present invention essentially relates to further developments of the planar drive systems disclosed in the publications WO 2013/059934 A1, WO 2015/017933 A1, WO 2015/179962 A1, WO 2015/184553 A1, WO 2015/188281 A1 and WO 2017/004716 A1. The disclosure content of the aforementioned publications is made the additional subject matter of the present description in its entirety by reference.

Furthermore, the invention relates to further developments of the planar drive systems disclosed in German patent applications 10 2017 131 304.4, 10 2017 131 314.1, and 10 2017 131 321.4, filed with the German Patent and Trademark Office on 27 Dec. 2017. The disclosure content of the German patent applications 10 2017 131 304.4, 10 2017 131 314.1, and 10 2017 131 321.4 is made the additional subject matter of the present description in its entirety by reference.

Figure 1:
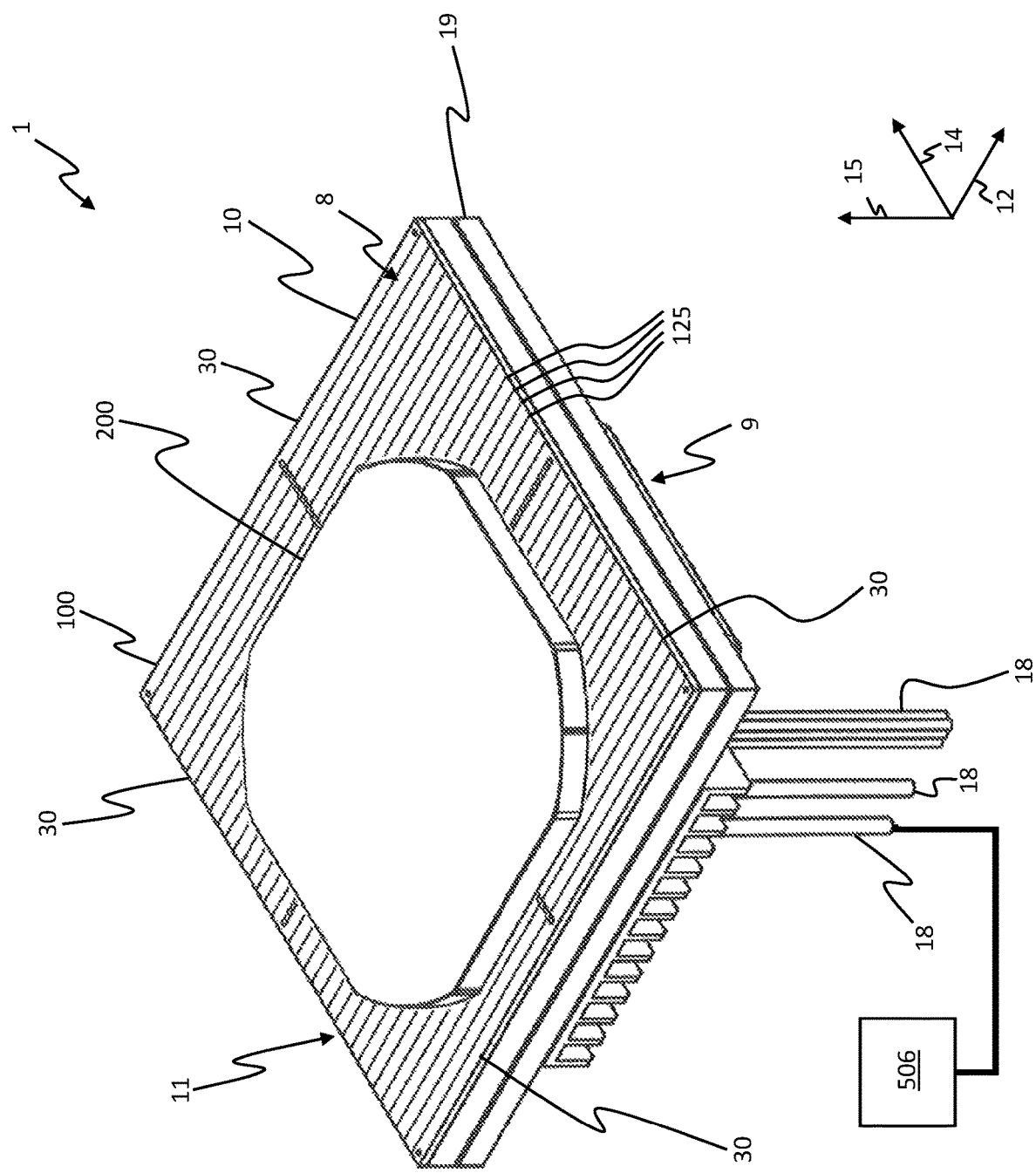
FIG. 1 shows a planar drive system for driving a mover on a drive surface.

FIG. 1 shows a device for driving at least one mover 200 on a drive surface in the form of a planar drive system 1 comprising a stator module 10 and a rotor formed by the mover 200.

The stator module 10 includes a module housing 19 and a stator assembly 100. The stator module 10 has a top side 8 and a bottom side 9 opposite the top side 8. The stator assembly 100 is arranged in a vertical direction 15 oriented from the bottom side 9 to the top side 8 above the module housing 19 and at the top side 8 of the stator module 10. The stator assembly 100 is formed as a planar stator and has a flat, i.e. planar, stator surface 11 on the upper side 8 of the stator module 10. The stator surface 11 likewise forms a surface of the stator module 10.

The stator surface 11 is oriented perpendicular to a vertical direction 15 and extends across the entire top surface 8 of the stator assembly 100 and the stator module 10 along directions 12 and 14. The stator assembly 100 includes at least one conductor strip 125 on the stator surface 11, to which a drive current may be applied. As shown, the stator assembly 100 may include a plurality of the conductor strips 125 on the stator surface 11. A drive current may be applied to each of the conductor strips 125 by a control unit 506. With the drive currents in the conductor strips 125, a magnetic field may be generated that drives the mover 200 in interaction with drive magnets of the mover 200. The mover 200 and the stator assembly 100 with the current-carrying conductor strips 125 form an electromagnetic planar motor. The conductor strips 125 form coil conductors of the stator assembly 100 and may also be referred to as coil conductors.

During operation, the mover 200 is movably arranged above the stator surface 11 of the stator module 10 and, when operated, may be driven in a first direction 12 as well as in a second direction 14. The first direction 12 and the second direction 14 are linearly independent. In particular, the first direction 12 and the second direction 14 may be oriented perpendicularly with regard to each other, as shown in FIG. 1. The first direction 12 and the second direction 14 are each oriented in parallel to the stator surface 11 and perpendicular to the vertical direction 15. By driving the mover 200 in both the first direction 12 and the second direction 14, the mover 200 may be driven in any direction above the stator surface 11. In operation, the mover 200 may be held floating above the stator surface 11, e.g. by magnetic interaction between the drive magnets and suitable drive currents in the conductor strips 125. In addition to driving the mover 200 in the first and/or second directions 12, 14, it is also possible to drive it in the third, vertical direction 15. Furthermore, the mover 200 may also be rotated about its axis. The conductor strips represent conductor paths which may also be referred to as magnetic field generators.

The stator surface 11 is rectangular in shape. In particular, the stator surface 11 may be square in shape, as shown. The stator surface 11 is limited by four respective straight outer edges 30. In each case, two mutually opposite outer edges 30 are oriented in parallel to the first direction 12 and two mutually opposite further outer edges 30 are oriented in parallel to the second direction 14.

An extension of the stator assembly 100 in the vertical direction 15 is smaller than an extension of the stator assembly 100 in the first and second directions 12, 14. Therefore, the stator assembly 100 forms a flat cuboid extending in the first and second directions 12, 14 or a plate extending in the first and second directions 12, 14.

Further components may be arranged at the module housing 19 or at the stator module 10 on the bottom side 9 of the stator module 10 or on the bottom side of the module housing 19. These further components extend at most to the outer edges 30 of the stator assembly 100 in the first direction 12 or in the second direction 14, so that the further components do not project beyond the outer edges 30 of the stator assembly 100 in the first or the second direction 12, 14.

Connections for connecting the stator module 10 to a plurality of connecting lines 18 are arranged on the bottom side of the module housing 19. The connecting lines 18 may e.g. comprise an input line of a data network, an output line of the data network, and a power supply line for supplying electrical power to the stator module 10. In addition, a control unit 506 may be connected to a connecting line 18. In particular, electrical power may be supplied to the stator module 10 via the power supply line to generate the drive currents. Via the data network, the stator module 10 may be connected to a control unit of the planar drive system, wherein the control unit of the planar drive system may be the control unit 506. With the data network, for example, control data for controlling the mover 200 or for controlling the targeted application of suitable drive currents to the conductor strips may be exchanged with the control unit 506.

In the first direction 12, the stator surface 11 may have an extension of between 100 mm and 500 mm, in particular between 120 mm and 350 mm, in particular of 240 mm. In the second direction 12, the stator surface 11 may have an extension of between 100 mm and 500 mm, in particular of between 120 mm and 350 mm, in particular of 240 mm. In the vertical direction 15, the stator module 10 may have an extension of between 10 mm and 100 mm, in particular of between 15 mm and 60 mm, in particular of 30 mm. In the vertical direction 15, the module housing 19 may have an extension of between 8 mm and 80 mm, in particular of between 13 mm and 55 mm, in particular of 26.6 mm. The module housing 19 may have the same extension in the first and/or second direction 12, 14 as the stator surface 11.

Figure 2:
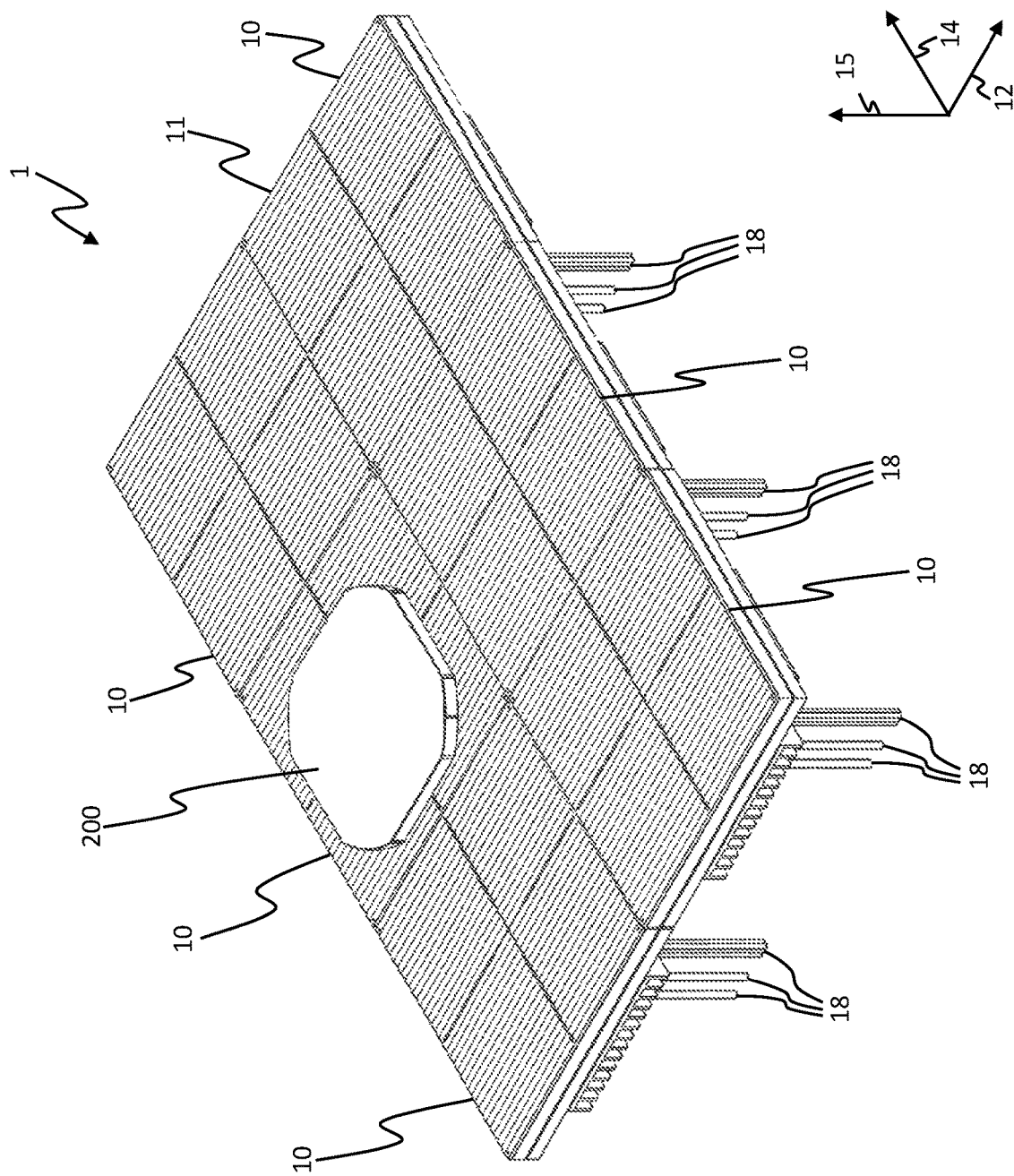
FIG. 2 shows a view of another drive system comprising six stator modules arranged side by side.

Multiple specimens of the stator module 10 may be arranged adjacent to each other in such a way that the outer edges 30 of adjacent stator modules 10 adjoin on one another and the stator surfaces 11 of the stator modules 10 form a continuous drive surface over which the mover 200 may be moved without interruption, as shown in FIG. 2. Since the side surfaces of the stator module 10 are flush with the stator surface 11 at the outer edges 30, the stator surfaces 11 of two adjacent stator modules 10 may be arranged almost seamlessly adjoining each other by arranging the stator modules 10 with adjoining side surfaces of the stator assemblies 100 or adjoining outer edges 30 of the stator surfaces 11.

Adjacent stator modules 10 are each arranged adjacent to each other such that the outer edges 30 of the stator surfaces 11 of adjacent stator modules 10 adjoin on one another. As a result, the stator surfaces 11 of the stator modules 10 form a continuous, planar drive surface for the mover 200. The mover 200 may be moved seamlessly from the stator surface 11 of one of the stator modules 10 onto or over the stator surface 11 of the adjacent stator module 10. Control signals and/or power may be supplied to each of the stator modules 10 via respective associated connecting lines 18. Alternative embodiments of the stator modules 10 may also include electrical connecting elements by which control signals and/or electrical power may be transmitted from one stator module 10 to the adjacent stator module 10. Such connecting elements may e.g. be arranged on the side surfaces of the stator modules 10. The connecting elements may be embodied as connectors or as contact surfaces that may be arranged adjoining one another.

In alternative embodiments, the stator modules 10 may also be connected to a central power supply device and/or a central control unit in a star configuration, each via their own connecting lines.

Figure 3:
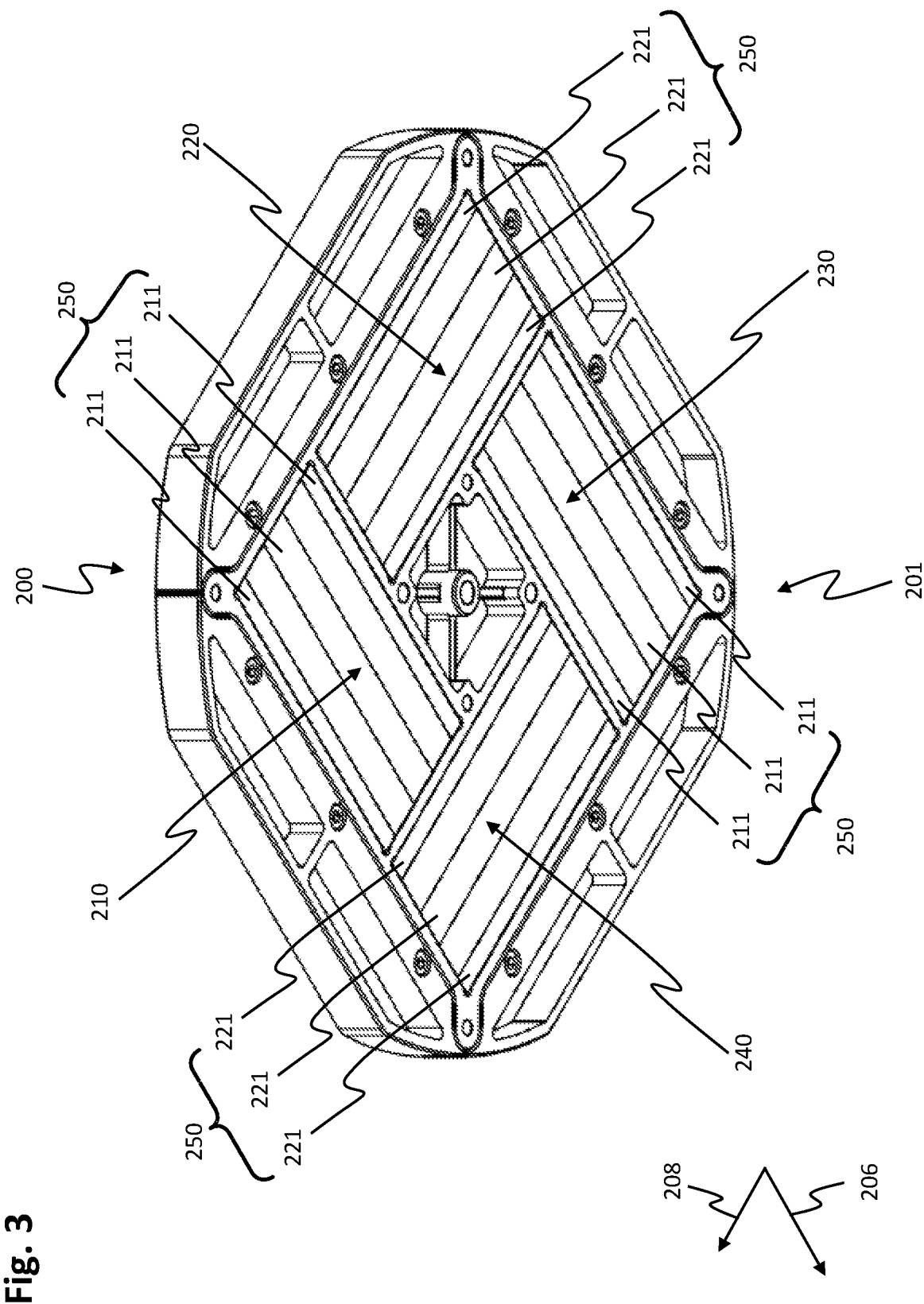
FIG. 3 shows the mover of the planar drive system shown in FIG. 1 with a magnet arrangement.

FIG. 3 shows the rotor, i.e. the mover 200, in a view from below onto a bottom side of the mover 200. The mover 200 comprises a magnet arrangement 201 on the bottom side. The magnet arrangement 201 is rectangular, in particular square, in shape and comprises a plurality of magnets. The bottom side of the mover 200 is flat or planar, in particular in the area of the magnets of the magnet arrangement 201. In operation, the bottom side of the mover 200 comprising the magnet arrangement 201 is essentially oriented in parallel to the stator surface 11 and is arranged facing the stator surface 11.

The magnet arrangement 201 includes a first magnet unit 210, a second magnet unit 220, a third magnet unit 230, and a fourth magnet unit 240. The first magnet unit 210 and the third magnet unit 230 each comprise drive magnets 211 extending in an elongated manner in a first rotor direction 206 and arranged side by side along a second rotor direction 208 oriented perpendicularly with regard to the first rotor direction 206. In particular, the first and third magnet units 210, 230 may each have three drive magnets 211. The second magnet unit 220 and the fourth magnet unit 240 each have further drive magnets 221 arranged side by side in the first rotor direction 206 and extending in an elongated manner along the second rotor direction 208. In operation, the first and third magnet units 210, 230 serve to drive the mover 200 in the second rotor direction 208, and the second and fourth magnet units 220, 240 serve to drive the mover 200 in the first rotor direction 206. The drive magnets 211 of the first and third magnet units 210, 230 and the further drive magnets 221 of the second and fourth magnet units 220, 240 are respectively magnetized perpendicular with regard to the first and second rotor directions 206, 208.

The drive magnets 211 and/or further drive magnets 221 represent second magnetic field generators 250. The second magnetic field generators 250 may also have other materials, functional principles and/or shapes, in particular be embodied as magnets or permanent magnets.

Figure 4:
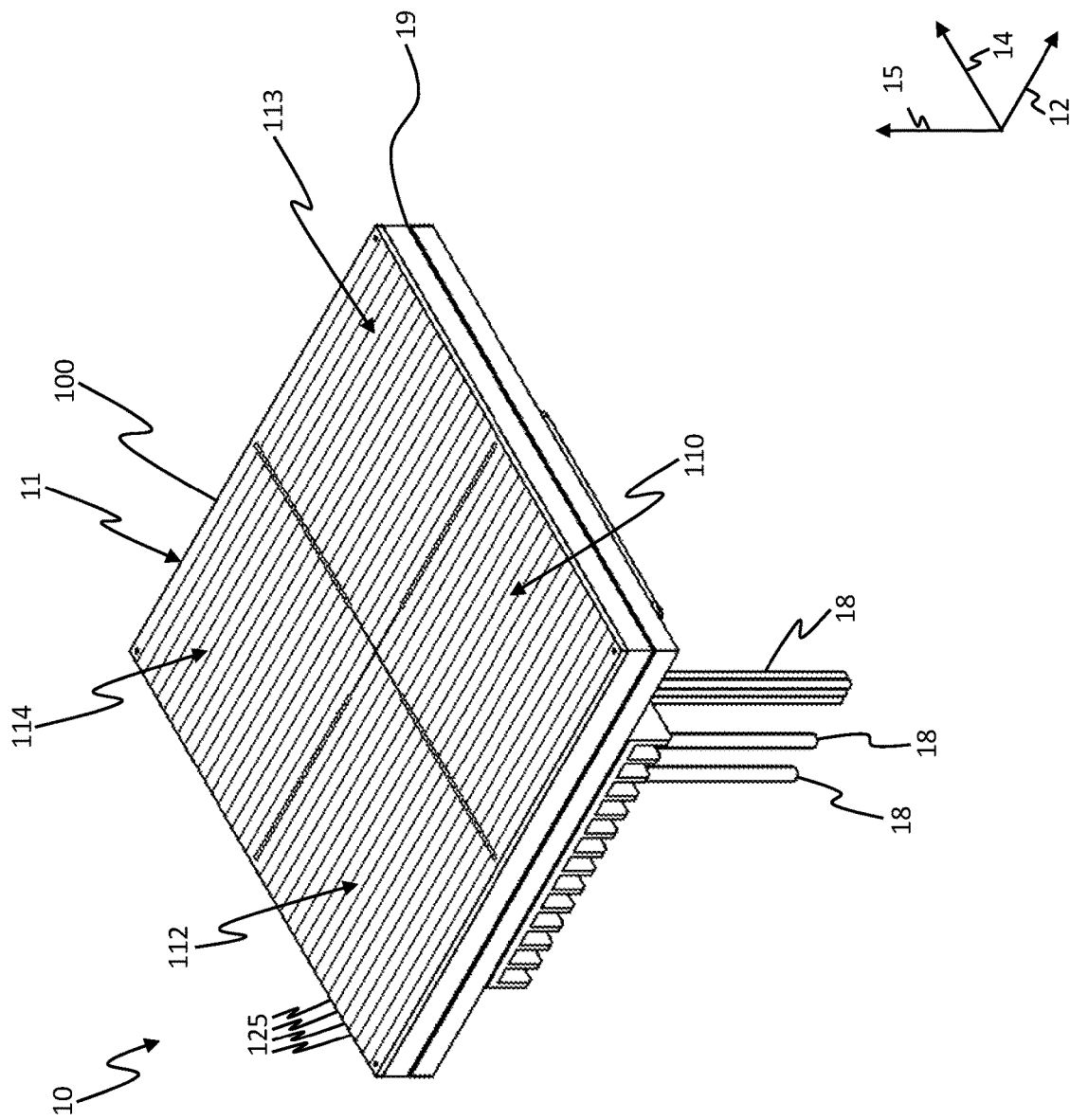
FIG. 4 shows a perspective view of a part of the drive system according to FIG. 1.

FIG. 4 shows the stator module 10 of the planar drive system 1 in a perspective view without the mover 200. The stator assembly 100 of the stator module 10 comprises a first stator sector 110, a second stator sector 112, a third stator sector 113, and a fourth stator sector 114. The stator sectors 110, 112, 113, 114 each in turn comprise a portion of conductor strips 125 disposed on the stator surface 11 of the stator assembly 100. Each of the conductor strips 125 on the stator surface 11 is arranged entirely within one of the stator sectors 110, 112, 113, 114. The stator sectors 110, 112, 113, 114 are rectangular in shape. In particular, the stator sectors 110, 112, 113, 114 may be square in shape such that an extension of the stator sectors 110, 112, 113, 114 in the first direction 12 corresponds to an extension of the stator sectors 110, 112, 113, 114 in the second direction 14.

The stator sectors 110, 112, 113, 114 each comprise a quarter of the area, i.e., a quadrant, of the stator assembly 100.

Within the stator sectors 110, 112, 113, 114, the conductor strips 125 are arranged in a plurality of stator layers or stator planes arranged on top of one another, each of the stator layers comprising only conductor strips 125 either essentially extending in an elongated manner along either the first direction 12 or essentially along the second direction 14. Apart from the extension of the conductor strips 125, and unless differences are described in the following, the stator sectors 110, 112, 113, 114 are formed identically on the different stator layers. In the stator assembly 100 of the stator module 10 shown in FIG. 4, the stator layer on the stator surface 11 comprises only conductor strips 125, which extend in an elongated manner along the first direction 12 and are arranged side by side and adjoining one another along the second direction 14.

The stator layer visible in FIG. 4 at the stator surface 11 forms a first stator layer of the stator assembly 100. In the vertical direction 15 below the first stator layer, the stator assembly 100 comprises at least one more second stator layer.

Figure 5:
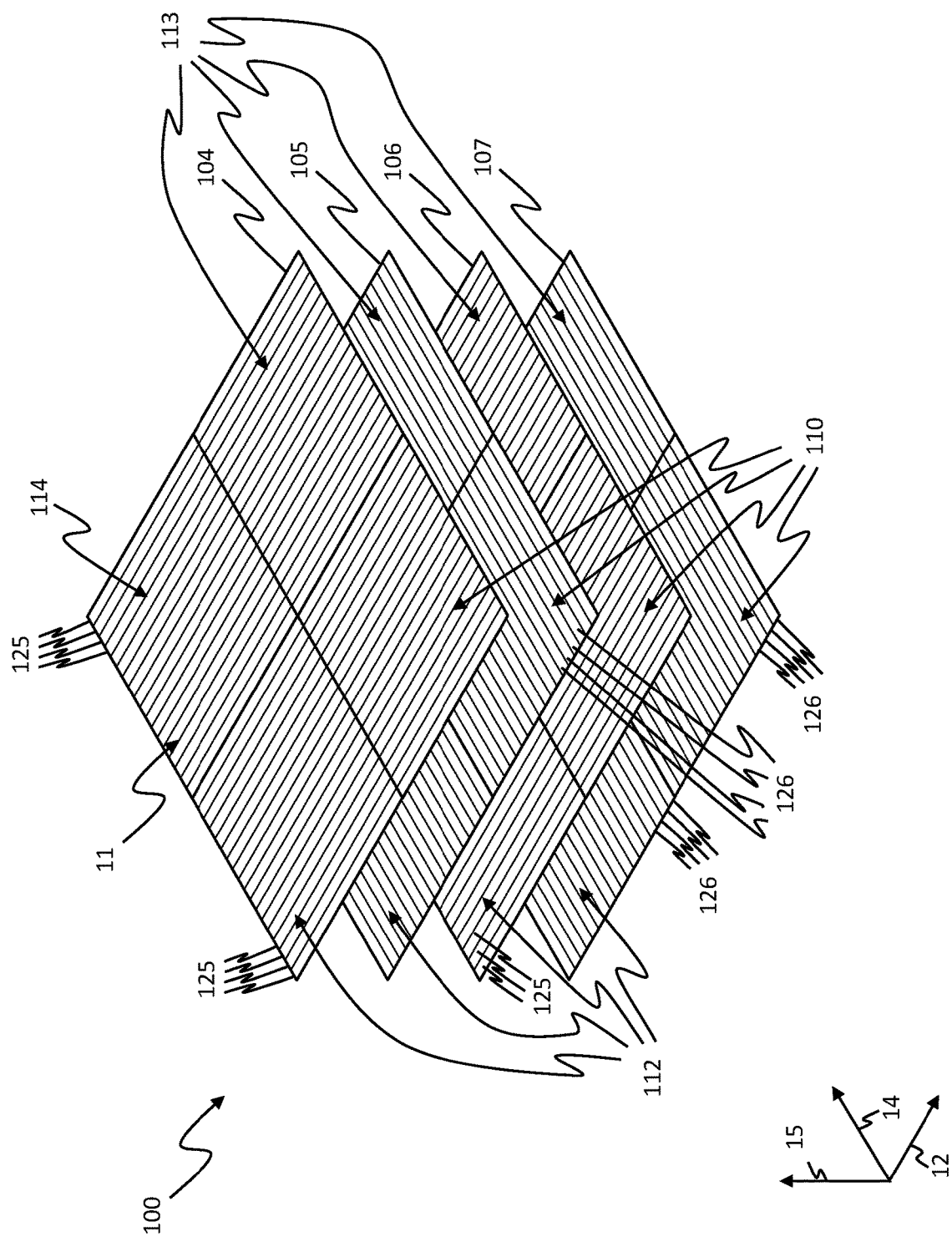
FIG. 5 shows an exploded view of a sector of the drive system shown in FIG. 1 with first, second, third and fourth stator layers.

FIG. 5 shows a schematic perspective depiction of an exploded view of the stator assembly 100 with the individual stator layers.

In the vertical direction 15, the stator assembly 100 comprises a second stator layer 105 below the first stator layer 104 arranged on the stator surface 11, a third stator layer 106 below the second stator layer 105, and a fourth stator layer 107 below the third stator layer 106. Unless differences are described in the following, the second, third, and fourth stator layers 105, 106, 107 are formed like the first stator layer 104 on the stator surface 11 of the stator assembly 100 shown in FIG. 4.

In the third stator layer 106, as in the first stator layer 104, the first to fourth stator sectors 110, 112, 113, 114 comprise conductor strips 125 extending in an elongated manner along the first direction 12 and arranged side by side and adjoining one another in the second direction 14. In the second stator layer 105 and in the fourth stator layer 107, the first to fourth stator sectors 110, 112, 113, 114 comprise further conductor strips 126. Unless differences are described in the following, the further conductor strips 126 are formed like the conductor strips 125 in the first stator layer 104 and in the third stator layer 106. Unlike the conductor strips 125 of the first and third stator layers 104, 106, the further conductor strips 126 of the second and fourth stator layers 105, 107 extend in an elongated manner along the second direction 14 and are arranged side by side and adjoining one another in the first direction 12.

In the first and third stator layers 104, 106, the first to fourth stator sectors 110, 112, 113, 114 exclusively comprise the conductor strips 125 extending in an elongated manner along the first direction 12 and not additionally the further conductor strips 126 extending in an elongated manner along the second direction 14. Similarly, in the second and fourth stator layers 105, 107, the first to fourth stator sectors 110, 112, 113, 114 exclusively comprise the further conductor strips 126 extending in an elongated manner along the second direction 14 and not additionally the conductor strips 125 extending in an elongated manner along the first direction 12.

The first to fourth stator sectors 110, 112, 113, 114 each have the same dimensions in all first to fourth stator layers 104, 105, 106, 107. In particular, the first to fourth stator sectors 110, 112, 113, 114 each have the same dimensions in all first to fourth stator layers 104, 105, 106, 107 in the first direction 12 and in the second direction 14.

The conductor strips 125 and the further conductor strips 126 of first to fourth stator layers 104, 105, 106, 107 arranged on top of one another are each embodied to be electrically insulated from one another. For example, the first to fourth stator layers 104, 105, 106, 107 may each be formed as mutually insulated conductor path layers of a multi-layer printed circuit board.

The first to fourth stator sectors 110, 112, 113, 114 are embodied to be energizable independently from one another. In particular, the conductor strips 125 and the further conductor strips 126 of the first to fourth stator sectors 110, 112, 113, 114 are embodied on the stator assembly 100 to be electrically insulated from one another.

While the conductor strips 125 and the further conductor strips 126 of the individual first to fourth stator sectors 110, 112, 113, 114 on the stator assembly 100 are each embodied to be electrically isolated from the conductor strips 125 and the further conductor strips 126 of the remaining first to fourth stator sectors 110, 112, 113, 114, the conductor strips 125 and further conductor strips 126 within the individual first to fourth stator sectors 110, 112, 113, 114 may each be electrically conductively connected to one another. In particular, within each of the first to fourth stator sectors 110, 112, 113, 114, stacked conductor strips 125 of the first stator layer 104 and the third stator layer 106 may be electroconductively connected to one another. For example, respective conductor strips 125 of the first to fourth stator sectors 110, 112, 113, 114 arranged on top of one another may be connected in series. Similarly, within each of the first to fourth stator sectors 110, 112, 113, 114, further conductor strips 126 of the second stator layer 105 and the fourth stator layer 107 may be electrically conductively interconnected. For example, further conductor strips 126 of the first to fourth stator sectors 110, 112, 113, 114 arranged on top of one another may be connected in series.

Alternative embodiments of the stator assembly 100 may comprise further stator layers arranged one below the other between the second and third stator layers 105, 106 in the vertical direction 15. In this context, the stator assembly 100 may in the vertical direction 15 in each case comprise alternating stator layers having conductor strips 125 essentially extending in an elongated manner along the first direction 12 and stator layers with further conductor strips 126 essentially extending in an elongated manner along the second direction 14. In an alternative embodiment, the stator assembly 100 may in the vertical direction 15 comprise respective stator layers having conductor strips 125 essentially extending in an elongated manner along the first direction 12 and stator layers having further conductor strips 126 essentially extending in an elongated manner along the second direction 14, wherein the sum of the stator layers having conductor strips 125 essentially extending in an elongated manner along the first direction 12 and the sum of the stator layers having further conductor strips 126 essentially extending in an elongated manner along the second direction 14 have an equal mean distance from the stator surface 11. Furthermore, in alternative embodiments of the stator assembly 100, further stator layers with conductor strips 125 extending in an elongated manner along the first direction 12 or with further conductor strips 126 extending in an elongated manner along the second direction 14 may be arranged between the first and the second stator layers 104, 105 and/or between the third and the fourth stator layers 106, 107.

The conductor strips 125, 126 of the first through fourth stator sectors 110, 112, 113, 114 are respectively combined into stator segments within the first through fourth stator layers 104, 105, 106, 107.

Figure 6:
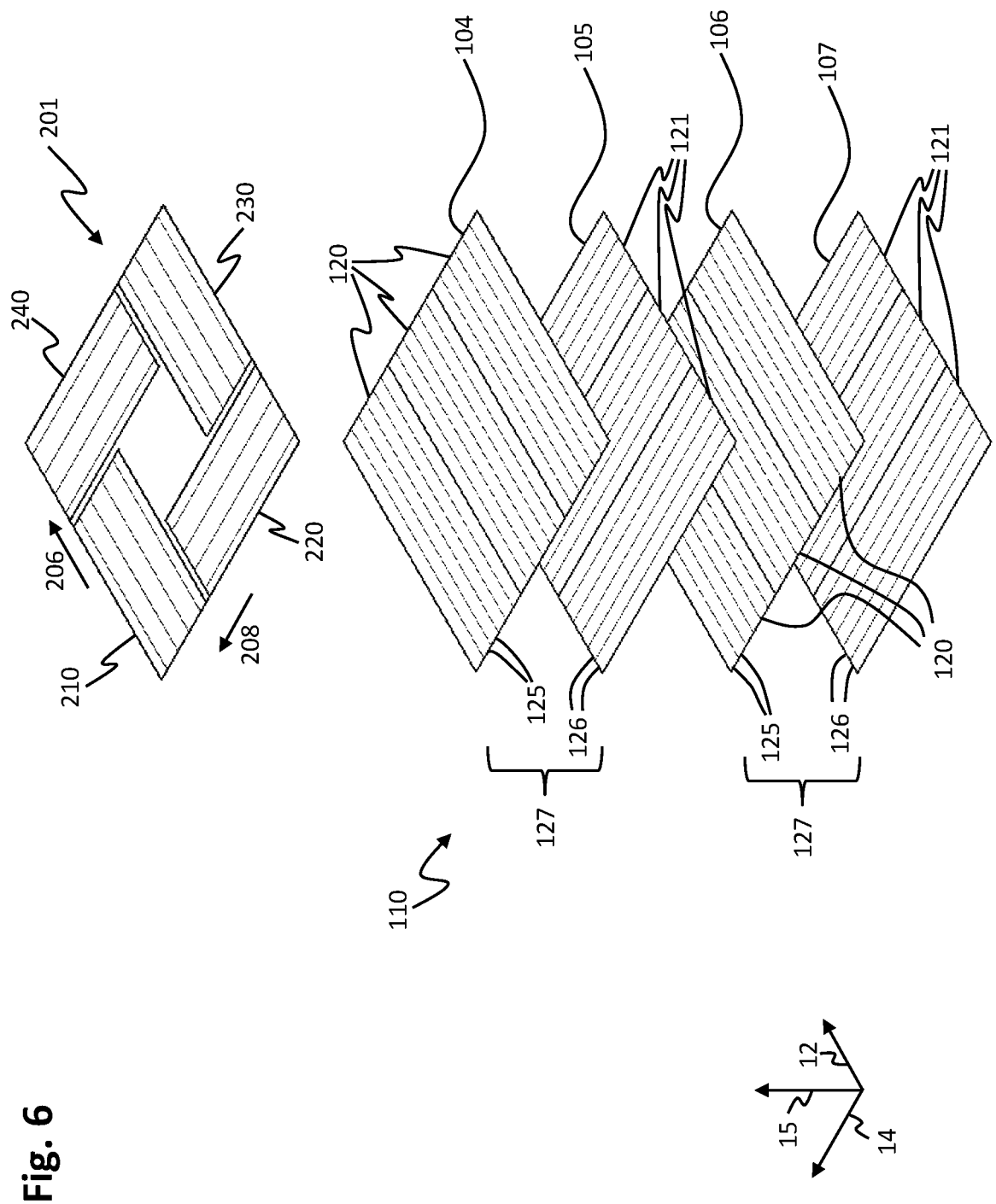
FIG. 6 shows the stator layers shown in FIG. 5 of the first sector of the device with individual stator segments.

FIG. 6 shows a schematic depiction of the first to fourth stator layers 104, 105, 106, 107 of the first stator sector 110 with the individual stator segments.

The conductor strips 125 and further conductor strips 126 of the first stator sector 110 are combined into stator segments 120, 121 within each of the first to fourth stator layers 104, 105, 106, 107. In each of the first to fourth stator layers 104, 105, 106, 107, the first stator sector 110 comprises three stator segments 120, 121 arranged side by side and adjoining one another. Each of the stator segments 120, 121 comprises six conductor strips 125 or further conductor strips 126 arranged side by side. The first stator sector 110 comprises three first stator segments 120 in each of the first and third stator layers 104, 106 and three second stator segments 121 in each of the second and fourth stator layers 105, 107. The first stator segments 120 each comprise six adjacent ones of the conductor strips 125 arranged side by side along the second direction 14 and extending in an elongated manner along the first direction 12, and the second stator segments 121 each comprise six adjacent ones of the further conductor strips 126 arranged side-by-side along the first direction 12 and extending in an elongated manner along the second direction 14.

Thus, in the first stator layer 104 and in the third stator layer 106, the first stator sector 110 of the stator assembly 100 exclusively comprises conductor strips 125 in an elongated manner along the first direction 12, and, in the second stator layer 105 and in the fourth stator layer 107, exclusively further conductor strips 126 in an elongated manner along the second direction 14.

The first and second stator segments 120, 121 have identical dimensions except for their orientation. In particular, the dimensions of the first stator segments 120 in the first direction 12 correspond to the dimensions of the second stator segments 121 in the second direction 14, and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first and third stator layers 104, 106 of the first stator sector 110 extends in the first direction 12 over the three second stator segments 121 of the second and fourth stator layers 105, 107 of the first stator sector 110 that are arranged side by side to one another in the first direction 12. Further, the second stator segments 121 of the second and fourth stator layers 105, 107 of the first stator sector 110 extend in the second direction 14 over all of the first stator segments 120 of the first and third stator layers 104, 106 of the first stator sector 110 that are arranged side by side to one another in the second direction 14.

The arrangement of the conductor strips 125 and further conductor strips 126 in the first to fourth stator layers 104, 105, 106, 107 of the second stator sector 112, the third stator sector 113 and the fourth stator sector 114 corresponds to the arrangement of the conductor strips 125 and further conductor strips 126 in the first to fourth stator layers 104, 105, 106, 107 of the first stator sector 110 shown in FIG. 6.

When operating the planar drive system 1, the mover 200 may be aligned over the stator assembly 100 such that the first rotor direction 206 is oriented along the first direction 12 and the second rotor direction 208 is oriented along the second direction 14. In operation, the first magnet unit 210 and the third magnet unit 230 may interact with the magnetic field generated by the conductor strips 125 of the first stator segments 120 to drive the mover 200 along the second direction 14. The second magnet unit 220 and the fourth magnet unit 240 may in operation interact with the magnetic field generated by the further conductor strips 126 of the second stator segments 121 to drive the mover 200 along the first direction 12.

Alternatively, other than shown in FIG. 6, the mover 200 may be oriented such that the first rotor direction 206 is oriented along the second direction 14 and the second rotor direction 208 is oriented along the first direction 12. In this case, the first and third magnetic units 210, 230 interact with the magnetic field of the second stator segments 121 to drive the mover 200 in the first direction 12 and the second and fourth magnetic units 220, 240 interact with the magnetic field of the first stator segments 120 to drive the mover 200 in the second direction 14.

The conductor strips 125 or further conductor strips 126 of the individual first or second stator segments 120, 121 may each be supplied with the drive currents independently of the conductor strips 125 or further conductor strips 126 of the remaining first or second stator segments 120, 121. In particular, the drive currents in one of the first or second stator segments 120, 121 do not necessarily depend on drive currents in one of the other first or second stator segments 120, 121. Furthermore, the conductor strips 125 or further conductor strips 126 of one of the first or second stator segments 120, 121 may be energized with drive currents while the conductor strips 125 or further conductor strips 126 of another, for example an adjacent, first or second stator segment 120, 121 are without current. The conductor strips 125 or further conductor strips 126 of the individual first or second stator segments 120, 121 are electrically isolated from the conductor strips 125 or further conductor strips 126 of the remaining first or second stator segments 120, 121 on the stator assembly 100. The conductor strips 125 or further conductor strips 126 of different first or second stator segments 120, 121 may e.g. be supplied with the drive currents from respective separate power modules or from separate power generation units or output stages of a power module of the stator module 10.

The conductor strips 125 or further conductor strips 126 in the individual first to fourth stator sectors 110, 112, 113, 114 may each be interconnected to form multi-phase systems with a shared neutral point. The neutral point may be formed on the stator assembly 100. In particular, the conductor strips 125 or further conductor strips 126 may be interconnected to form three-phase systems with a shared neutral point. The three-phase systems may each comprise six adjacent conductor strips 125 or six adjacent further conductor strips 126. The number of adjacent conductor strips 125 or further conductor strips 126 in one of the three-phase systems may also be three, twelve or another multiple of three in each case.

The multiphase systems may be contactable on the stator assembly 100 in such a way that each of the multiphase systems may be supplied with a drive current independently of the other multiphase systems. Alternatively, two or more of the multiphase systems may each be connected to one another on the stator assembly 100 such that a common drive current is jointly applied to each of the connected multiphase systems. For example, the connected multiphase systems on the stator assembly 100 may be connected in series or in parallel.

If the conductor strips 125 or further conductor strips 126 are interconnected to form multiphase systems, fewer contacts are required for energizing the conductor strips 125 or further conductor strips 126 than when separately energizing the individual conductor strips 125 or further conductor strips 126. This reduces the amount of hardware required for energizing the conductor strips 125 or further conductor strips 126, in particular the number of power-generating units required for energization.

The first to fourth stator sectors 110, 112, 113, 114 may each include eighteen conductor strips 125 or further conductor strips 126 in each of the first through fourth stator layers 104, 105, 106, 107, as shown in FIGS. 4 and 5. Six adjacent conductor strips 125 or further conductor strips 126 may each be interconnected to form a three-phase system, and the first to fourth stator sectors 110, 112, 113, 114 may each comprise three three-phase systems side by side in the first direction 12 and three three-phase systems arranged side by side in the second direction 14. In this regard, conductor strips 125 or further conductor strips 126, which are essentially extended in the same direction 12, 14 and are positioned on top of one another in the first to fourth stator layers 104, 105, 106, 107, may be connected in series to form a common three-phase system. The conductor strips 125 or further conductor strips 126 may thereby be connected in such a way that conductor strips 125 or further conductor strips 126 positioned on top of one another in the vertical direction 15 are each supplied with the same drive current. The three-phase systems thus have three phases which are interconnected through conductor strips 125 or further conductor strips 126 positioned on top of one another in the first to fourth stator layers 104, 105, 106, 107.

For example, in each of the individual first to fourth stator layers 104, 105, 106, 107, all conductor strips 125 or further conductor strips 126 positioned on top of one another and aligned in parallel may be connected in series. In particular, the conductor strips 125 of three-phase systems positioned on top of one another in the first stator layer 104 and in the third stator layer 106, and the further conductor strips 126 of three-phase systems positioned on top of one another in the second stator layer 105 and in the fourth stator layer 107 may each be connected in series to form a shared three-phase system. Thereby, all conductor strips 125 or further conductor strips 126 of the first and third stator layers 104, 106 and of the second and fourth stator layers 105, 107 which are positioned on top of one another in the vertical direction 15 and oriented in parallel may be connected in series.

In particular, in the stator assembly 100 within the individual stator segments 120, the conductor strips 125 extending in an elongated manner along the first direction 12 are each connected to form multiphase systems with a shared neutral point. In this case, the individual multiphase systems of different stator segments 120 may each be energized independently of one another. Similarly, all further conductor strips 126 of the individual further stator segments 121 are each connected to form further multiphase systems. The individual further multiphase systems of the further stator segments 121 may each be supplied with current independently of one another and independently of the multiphase systems of the stator segments 120. In particular, the conductor strips 125 of the stator segments 120 and the further conductor strips 126 of the further stator segments 121 are each connected to form three-phase systems. A three-phase drive current may be applied to each of the conductor strips 125 and the further conductor strips 126. The drive currents comprise a first phase U, a second phase V and a third phase W, each having a phase offset of 120° with regard to one another.

The conductor strips 125 are spatially offset in the second direction 14 by in each case one third of the effective wavelength of the drive magnets 211 of the first and third magnet units 210, 230 interacting with the conductor strips 125. The further conductor strips 126 are arranged spatially offset in the first direction 12 by in each case one third of the effective further wavelength of the further drive magnets 221 of the second and fourth magnet units 220, 240 interacting with the further conductor strips 126.

The mover represents the movable element of the device and elements for generating a magnetic field, in particular magnets or permanent magnets. The magnetic field of the mover, together with the variable magnetic field of the stator assembly, ensures that the mover is moved over the stator assembly so that, in particular, an air gap is formed between the stator assembly and the mover.

The conductor strips 125 and the further conductor strips 126 represent magnetic field generators 127.

FIG. 7 shows a schematic view of a section of a drive surface 510 in a top view. The drive surface 510 may be formed by a planar drive system described in FIGS. 1 to 6. However, other embodiments of planar drive systems that use magnetic fields to move a mover 200 on a drive surface 510 may also be used. An arrangement of 3×4 sectors 501 is shown. A sector 501 may be formed by a stator module 10 of FIGS. 1 to 6. In the embodiment example, the sectors 501 have the shape of squares. Depending on the chosen embodiment, the sectors may also have other shapes, such as rectangles or triangles, etc. For example, a sector 501 may have a size in the range of 150 mm×150 mm up to 240 mm×240 mm. Depending on the chosen embodiment, a sector 501 may also have other sizes. In addition, sectors 501 may also have different sizes.

In addition, a mover 200 is shown. For example, the mover 200 is embodied as a rotor, as described in FIGS. 1 to 3. The mover 200 may have a square, round or rectangular shape or other shapes. For example, the mover 200 may have a size in the range of 100 mm×100 mm up to 200 mm×200 mm. The mover may have a thickness in the range of 8 mm to 20 mm. The drive surface 510, i.e. the stator modules 10 and the mover 200 may be configured to move the mover 200 at a speed of, for example, 1 m/s to 6 m/s. The drive surface 510, i.e., the stator modules 10 and the mover 200 may be embodied to move the mover 200 with an acceleration of up to 30 m/s$^2$ or more. Moreover, the mover 200 may be configured to support a load of up to 1.5 kg or more. Furthermore, the mover 200 may be embodied to have a distance to the drive surface 510 of up to 6 mm or more.

The mover 200 is shown in the form of a dashed square. Furthermore, a fictitious graph 503 with edges 504 and nodes 505 is schematically shown. The graph 503 is embodied as a network with edges 504 and nodes 505. The edges 504 are shown as straight lines. The nodes 505 are located at intersections of the edges 504. The shape of the graph 503 with edges 504 and nodes 505 limiting meshes in the form of triangles is one of several possible embodiments. For example, a graph may have edges and nodes, with the edges and nodes limiting meshes in the form of squares and/or meshes in the form of polygons. By rasterizing the graph in meshes, path finding is progressively restricted to one mesh at a time with the edges and nodes limiting the mesh. The graph 503 is stored in a data memory 512 of a control unit 506. The control unit 506 may be embodied as a computer. In addition, position sensors 560 may be provided to detect the position of a mover 200 and communicate the position to the control unit 506. For example, a position sensor 560 may be associated with each sector 501. The position sensors 560 may e.g. be embodied as Hall sensors.

The control unit 506 is configured to perform path planning for the mover 200 to a target point 508 depending on a starting point 507. The starting point 507 may be the current position of the mover 200. Furthermore, depending on the selected embodiment, the starting point 507 may also be predetermined independently of the current position of the mover 200. In the described embodiment example, the target point 508 is located on a node 505 of the graph 503 in the lower right sector 501. The starting point 507 is assumed to be a node 505 near the center of the mover 200. By using the graph 503, path planning is limited by the meshes and the edges and nodes. With the meshes, edges, and nodes, a path for the mover 200 from the starting point 507 to the target point 508 is searched. After or during determination of the path, the path may be smoothed according to predetermined rules to avoid excessive changes in direction along the path. For example, sections of the path that have a radius of curvature below a predetermined threshold may be adjusted such that the radii of curvature are above the threshold.

In addition, areas of the drive surface 510 may be blocked from path planning by an object 509 or a further first or second mover 513, 514 shown as dashed squares. The further first or second movers 513, 514 may each be in the form of a rotor, which has been described with reference to FIGS. 1 to 3.

If the starting point 507 and/or the target point 508 do not lie exactly on a node 505 or an edge 504 of the graph 503, a point of an edge 504 or a node 505 that is closest to the starting point 507 or the target point 508, respectively, may be used by the control unit 506 as the starting point 507 and as the target point 508 for the search in the graph 503. If the starting point 507 and/or the target point 508 do not lie exactly on a node 505 or an edge 504 of the graph 503, but in a mesh of the graph 503, then this starting point 507 and/or this target point 508 may also be used by the control unit 506 for the search in the graph 503.

In simple path planning, the control unit 506 e.g. determines the shortest path between the starting point 507 and the target point 508 using the existing edges 504 of the graph 503 and bypassing the object 509. FIG. 7 schematically shows a path 511 along edges 504 determined by the control unit 506, wherein the mover 200 is to be moved along the path from the starting point 507 to the target point 508.

As stated above, during path planning or at the end of path planning, the determined path may be smoothed. In addition, the shortest path may also be searched independently of edges 504 and nodes 505 across meshes from edges to edges and/or nodes. In addition, dynamic planning is performed on the path 511 by the control unit 506. For this purpose, depending on the determined path 511 and further parameters such as, for example, a maximum speed of the mover 200, a maximum negative and/or positive acceleration of the mover 200, or a maximum permissible transverse acceleration of the mover 200, the speed of the mover 200 along the path 511 and/or the negative and positive accelerations of the mover 200 along the path 511 are determined. In addition, further parameters may be taken into account which e.g. determine at which points in time the mover should be at which position of the path. Subsequently, the control unit 506 energizes the magnetic field generators of the sectors 501 in such a way that the mover 200 is moved along the path 511 from the starting point 507 to the target point 508. Depending on the chosen embodiment, the path planning and/or the dynamic planning and/or the control of the magnetic field generators, i.e. the power supply of the magnetic field generators, may be executed by different control units and/or by different programs of a control unit 506.

In another embodiment, edges 504 or at least portions of edges 504 between two nodes 505 have a weighting. The weightings of edges 504 may e.g. be stored in the data memory 512 or in a separate data memory. The control unit 506 is connected to the data memory 512. During path planning, the control unit 506 considers the weightings of the edges 504 of the graph 503 stored in the data memory 512.

For example, a weighting of an edge 504 may depend on the length of the edge that the mover 200 would have to travel if the edge 504 were used. The longer the edge, the greater the weighting of the edge 504 may be. In addition, the weighting of an edge 504 may depend on the maximum speed at which the edge 504 may be traveled by the mover 200. The lower the maximum speed, the higher the weighting of the edge 504 may be. In addition, the weighting of the edge 504 may depend on whether an obstacle is located on the edge 504. If an obstacle is located on the edge 504 or so close to the edge 504 that a mover 200 would collide with the obstacle when traveling along the edge 504, the edge 504 receives such a high weighting that this edge 504 is not considered by the control unit 506 during path planning.

Depending on the chosen embodiment, an edge 504 on which an object 509 is located as an obstacle may also be excluded from the path planning. The obstacle may be a stationary, i.e. static, obstacle in the form of an object 509 or a movable obstacle in the form of a further first or second mover 513, 514. As the further first or second movers 513, 514 may themselves move and thus represent movable obstacles, the weightings of the edges 504 may change in time with the position of the further first and/or second movers 513, 514. Only in the case of a stationary, i.e. static, obstacle does a blocking of the edges 504, which is determined by the corresponding weighting, remain unchanged in time.

In addition, a weighting of an edge 504 may depend on a temperature of the sector 501 over which the edge 504 passes. For example, the greater the temperature of the sector 501, the higher the weighting may be. As a result of energizing the magnetic field generators of the sectors 501, the sectors 501 heat up. Too high a temperature may be negative for a sector 501 and in particular for a magnetic field generator of a sector 501. Thus, it may be advantageous to prevent too high temperatures of the sectors 501. Corresponding temperature sensors 550 may be provided at the sectors 501 for detecting the temperatures of the sectors 501. The temperature sensors 550 transmit the current temperature of the sector 501 to the control unit 506. Accordingly, the control unit 506 may change the weighting of the edges 504 of a sector 501 depending on the temperature of the sector 501. For example, if edges 504 to be avoided are determined by a high weighting, the weighting of the edges 504 of a sector 501 may be increased as the temperature of the sector 501 increases. Depending on the chosen embodiment, the edges 504 leading over the sector 501 may be completely blocked by a correspondingly high weighting depending on a limit temperature of a sector 501 being exceeded. Thus, the temperature of the sectors 501 may be taken into account during path planning.

For example, for each individual edge 504 formed between two nodes 505 of the graph 503, a corresponding weighting may be stored in the data memory. The weightings of the edges may e.g. be changed by the control unit 506 according to predetermined rules.

Figure 8:
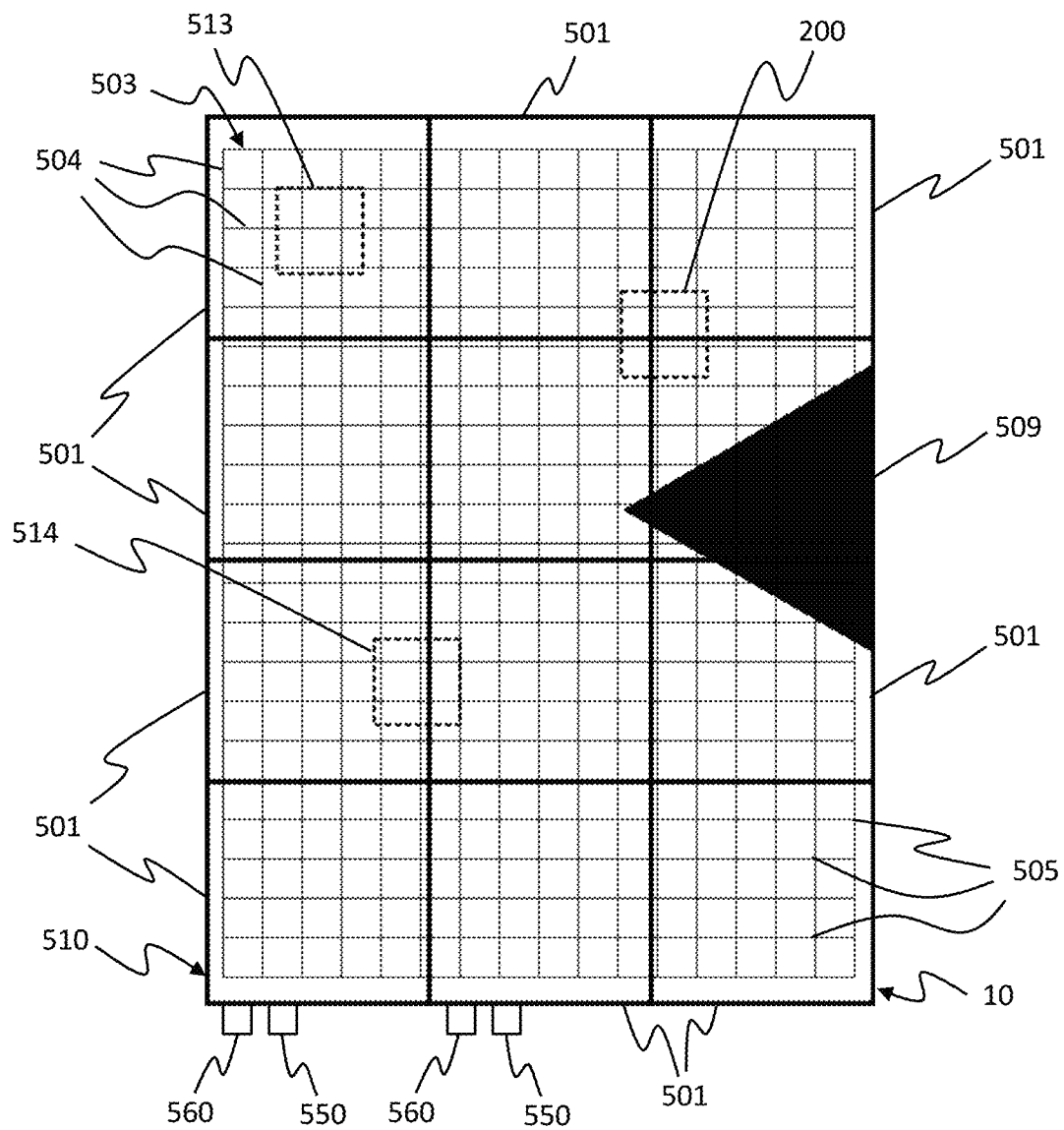
FIG. 8 shows a schematic depiction of the drive surface with another graph.

FIG. 8 shows in a schematic view a section of the drive surface 510 with the movers 200 and the further movers 513, 514 and the object 509 according to FIG. 7, but the graph 503 has a different grid. In this embodiment, the fictitious graph 503 has edges 504 and nodes 505 that form meshes with a rectangular pattern. A node 505 is arranged at each intersection of the edges 504. Depending on the chosen embodiment, the graph 503 may also have other shapes, in particular other meshes. For example, the graph 503 need not cover an entire drive surface 510, but may cover only individual surface regions of the drive surface 510. Furthermore, according to an embodiment, the graph 503 may have different densities of edges 504 and/or of nodes 505 and/or different mean lengths of edges 504 in different areas of the drive surface.

Figure 9:
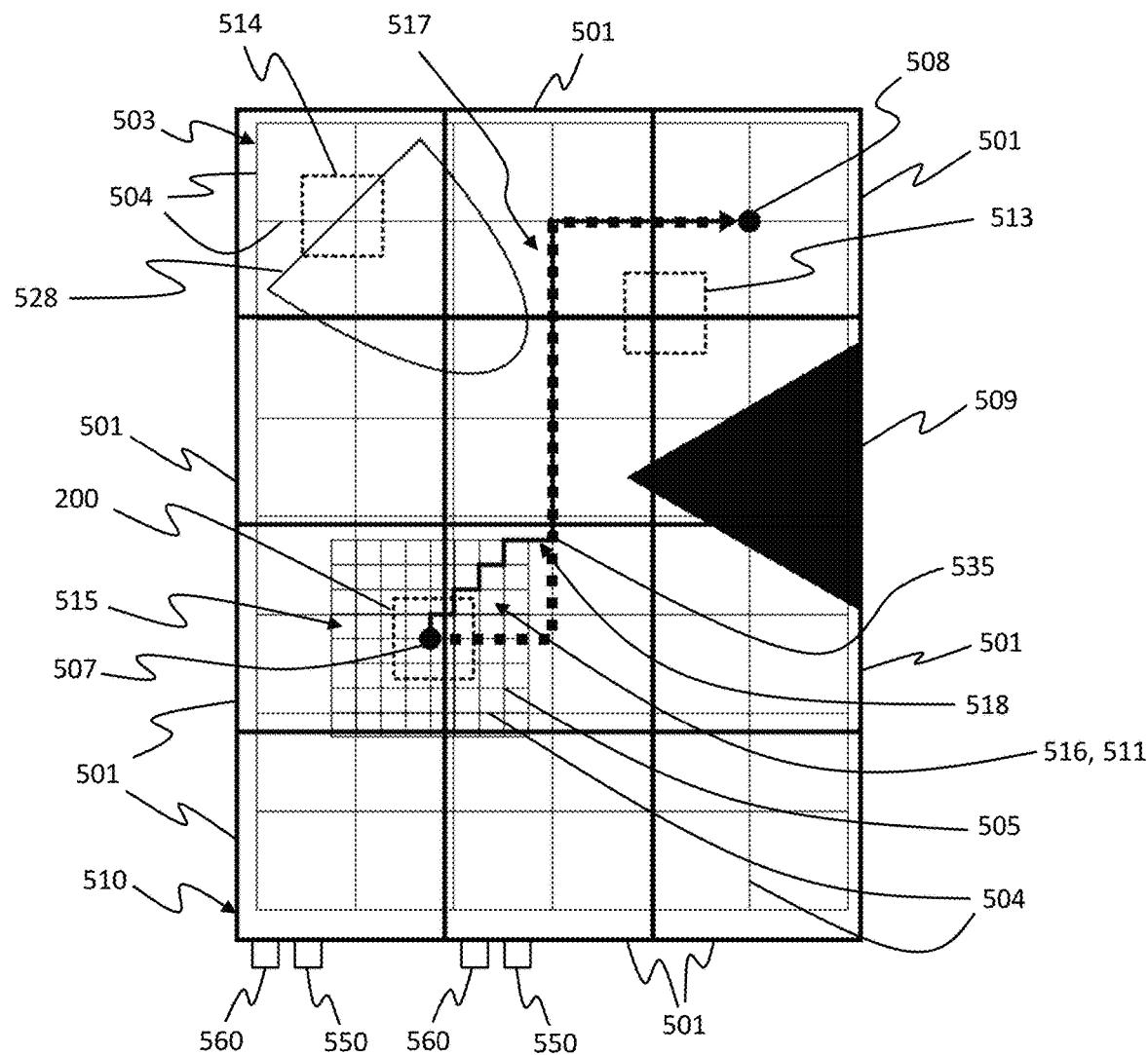
FIG. 9 shows a schematic depiction of the drive surface showing a graph with different densities of edges and nodes.

FIG. 9 shows a schematic representation of a further view of a drive surface 510, wherein the fictitious graph 503 in the embodiment shown here has a higher density of edges 504 and nodes 505 in a surrounding area 515 around the mover 200 than outside of the surrounding area 515. In the shown embodiment, the surrounding area 515 is formed as a square area with the mover 200 located at its center. In the shown embodiment, the graph 503 outside of the surrounding area 515 has only one fifth of the edges 504 and correspondingly fewer nodes 505 compared to the surrounding area 515. In addition, the mean length of the edges 504 in the surrounding area 515 is smaller than outside of the surrounding area 515.

Thus, a more accurate planning of the path is possible within the surrounding area 515 compared to the area outside of the surrounding area 515. Further, a second surrounding area may be provided surrounding the surrounding area 515, wherein outside of the second surrounding area the density of the edges 504 and/or of the nodes 505 and/or the mean length of edges 504 of the graph 503 decreases.

Moreover, in another embodiment, the density of edges 504 and nodes 505 of the graph 503 may gradually or progressively decrease with increasing distance from the current position of the mover 200.

For path planning, the control unit first determines a first path section 517 for the mover 200, which is schematically drawn in the form of a dotted line, from the starting point 507, which corresponds to the current position of the mover 200, to the predetermined target point 508. The first path section 517 is determined outside of the surrounding area 515 based on the larger grid of the graph 503. For planning the first path section 517, the larger grid of the graph 503 is also applied to the area inside of the surrounding area 515.

Then, the control unit determines an intermediate target 535 for a second path section 516 according to predetermined rules, wherein the intermediate target 535 is part of the first path section 517 and is arranged as close as possible, but outside of the surrounding area 515. In addition, the intermediate target 535 is to be selected such that it enables the shortest possible path to the target point 508. The control unit then determines a second path section 516 according to the meshes of the graph 503 within the surrounding area 515 as close as possible to the intermediate target 535, starting from the starting point 507 corresponding to the current position of the mover 200 to the intermediate target within the surrounding area 515. An end of the second path section 516 is connected to the intermediate target 535 via a bridging section 518 in the shortest possible path. The first path section 517 and the bridging section 518 are schematically shown in the form of a broader line.

In determining the path planning, both the object 509 and the further first and second movers 513, 514 acting as obstacles are taken into account. The object 509 and the further first and second movers 513, 514 are e.g. taken into account by a corresponding weighting of the edges 504 of the graph 503 which lead through the obstacles or are formed at such a close distance to the obstacles that contact between the mover 200 and the obstacle or the further first and/or second movers 513, 514 would be the consequence.

The control unit may be embodied to repeatedly perform path planning between the current position of the mover 200 and the target point 508 in predefinable time cycles until the mover 200 has arrived at the target point 508. During this process, the surrounding area 515 moves with the mover 200. After each path planning, dynamic planning is performed by the control unit 506 and then the magnetic field generators of the sectors 501 are energized in such a way that the mover 200 is moved along the first path section 516 as part of a path 511. The predefinable time cycles are e.g. selected to be so short that before an end of the first path section 516 is reached, path planning is performed again with a surrounding area 515 around the current position of the mover 200, so that the mover 200 is always moved only along a more precisely calculated first path section 516.

Depending on the selected embodiment, however, it may also be the case that the mover 200 is moved at least over the bridging section 518 and over a section of the second path section 517 before the path is recalculated. The first path section 516 is used for close-range planning and the second path section 517 is used for long-range planning. Depending on the selected embodiment, the control unit 506 may be configured to always execute the dynamic planning only up to the end of the first path section 516. This is useful if path planning is performed again with a new first path section 516 before the end of the first path section 516 is reached. In this way, computing time may be cut down on. The predefinable time cycles may be in a range of 100 µs to 400 µs, for example.

Depending on the selected embodiment, a future path of movement 528 on which the further second mover 514 will move may be taken into account in the path planning in such a way that the weighting of the edges located in the vicinity of the future path of movement 528 of the further second mover 514 is given a negative weighting for the path planning. For example, edges in a predetermined vicinity of the future movement path 528 of the further second mover 514 may receive a higher weighting. In addition, a future movement path of the further first mover 513 may analogously be taken into account in the path planning.

Figure 10:
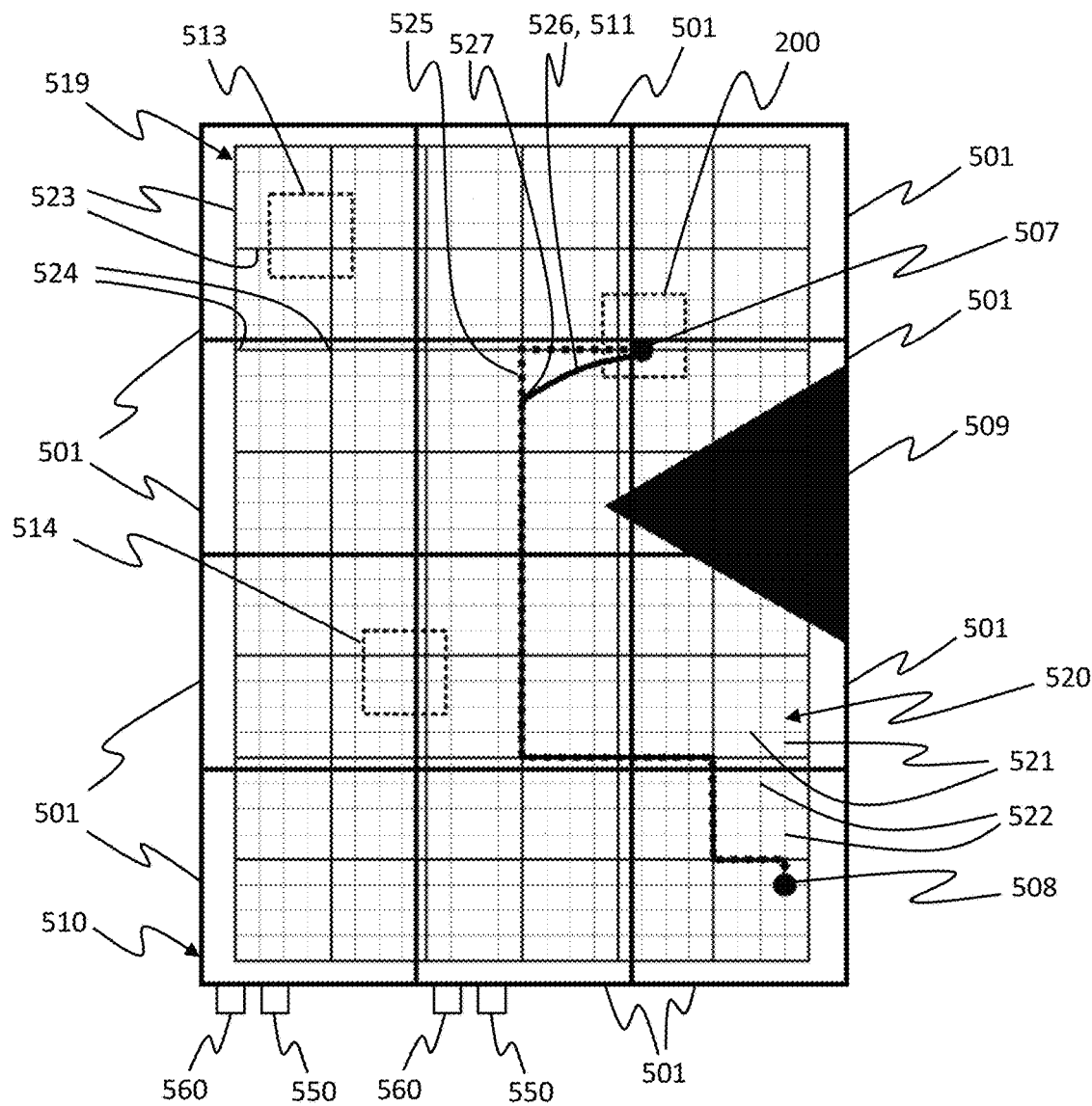
FIG. 10 shows a schematic depiction of the drive surface comprising two graphs having different densities of edges and nodes.

FIG. 10 shows a schematic representation of a drive surface 510 with sectors 501, wherein a fictitious first graph 519 and a fictitious second graph 520 are shown. The first graph 519 is shown in the form of thicker lines with first edges 523 arranged in a rectangular grid and intersecting at first nodes 524. The second graph 520 is shown in the form of thinner lines with second edges 521 arranged in a similarly rectangular grid, the second edges 521 intersecting at second nodes 522. In the first graph 519, the first edges 523 arranged in parallel have a larger distance with regard to each other than the second edges 521 of the second graph 520. Thus, the first graph 519 has a lower density of first nodes 524 and/or first edges 523 than the second graph 520. Thus, the second graph 520 provides a more accurate planning of the optimized path than the first graph 519. Two adjacent first edges 523 have a fourfold distance compared to two adjacent second edges 521. Depending on the chosen embodiment, other size differences may be used for the first and second graphs 519, 520. The first graph 519 has a lower density of nodes 505 and/or of edges 504 than the second graph 520. In addition, the meshes of the graphs 519, 520 may differ not only in size, but also in shape.

A path planning is now to be performed for the mover 200 to the target point 508, wherein the target point 508 is located in the right lowermost sector 501.

The control unit is embodied to execute the path planning from a starting point 507 to a target point 508 in two planning levels. A first planning level with the first graph 519 and a second planning level with the second graph 520 are provided.

The control unit uses the first graph 519 to perform a first path planning from the starting point 507 to the target point 508. In the process, e.g. a first path 525 is determined which is drawn schematically in the form of a dotted line.

Furthermore, based on the second graph 520, the control unit performs a second path planning for a second path 526 from the starting point 507 to an intermediate target 207 on the first path 525. The second path 526 is schematically depicted as a broader line in the second graph 520. The second path 526 is led across the meshes of the second graph 520.

The control unit takes both the first path 525 and the second path 526 into account for final path planning.

For efficient planning, the control unit uses a shared node 527 between the first graph 519 and the second graph 520 in the second path planning, which is located on the first path 525 of the first path planning, as an intermediate target for the second path planning. The shared node 527 of the first path 525 that may most conveniently be reached according to a strategy for the second path planning is selected. This requires that the first path planning is calculated further ahead in the direction of the target point 508 than the second path planning. Only then may the second path planning use a shared node 527 as an intermediate target. In this way, the second path planning, and thus the second path 526, is successively determined in the direction of the target point 508. For example, the second path planning is successively calculated at predetermined time intervals depending on the current position of the mover 200 as a new starting point 507 toward the target point 508. Here, the points in time are selected in such a way that the mover 200 is actually only ever moved along the second path 526 and the first path 525 is only used as a rough orientation for the further planning of the second path 526.

The first and second path planning, as well, are repeated at predetermined time intervals and, depending on the current position of the mover 200, the second path 526 in the direction of the target point 508 is determined cyclically. After the second path 526 has been determined, dynamic planning is performed according to the second path 526 for the mover 200, and the magnetic field generators are controlled by the control unit accordingly so that the mover 200 moves along the second path 526 as part of the path.

Depending on the chosen embodiment, more than two planning levels with graphs with different densities of edges and/or of nodes may be used in embodiments. The planning level with the lower resolution plans the approximate long-term path on a coarse grid structure with edges and nodes. The underlying planning level with the higher resolution plans a detailed path on a finer grid with edges and nodes for a given time horizon from the current position of the mover to a selected shared node with the graph of the higher planning level.

In addition, the graphs in the at least two planning levels may also have different basic structures.

In principle, the information flow may be transmitted from the path planning with the coarser graph, i.e. with the smaller density of edges and/or nodes, to the path planning with the more accurate graph. For example, dynamic planning is determined based on the path defined by the graph with the highest density of edges and/or of nodes and/or the smallest mean length of edges.

In a further embodiment, it may be convenient for dynamic planning to provide feedback to the path planning about the parameters on the dynamic planning caused by the path planning. For example, the determined second path may include drawbacks for dynamic planning. For example, a maximum possible speed of the mover may only be implemented as an average speed up to a certain percentage due to the shape of the second path. In addition, the second path for dynamic planning may e.g. include a high power consumption for the control of the magnetic field generators. For example, the second path may require a high amount of high accelerations and/or decelerations of the mover. The negative effects may be taken into account by the second path planning and/or be transmitted to the first path planning. Thus, the first path planning may also try to avoid negative effects on dynamic planning by appropriate path planning during another first path planning.

Depending on the chosen embodiment, the first path planning and the second path planning may operate in different time cycles.

The proposed decoupling in at least two planning levels for path planning offers the advantage that the two planning levels may be executed independently of each other. This e.g. allows the two planning levels to be easily distributed to two separate programs and/or to two separate control units.

The position of the mover, the further movers and/or the movement paths of the mover and/or of the further movers may be detected by the control unit 506 via corresponding position sensors 560 and e.g. be estimated on the basis of the present speed and/or acceleration and the direction of movement.

Figure 11:
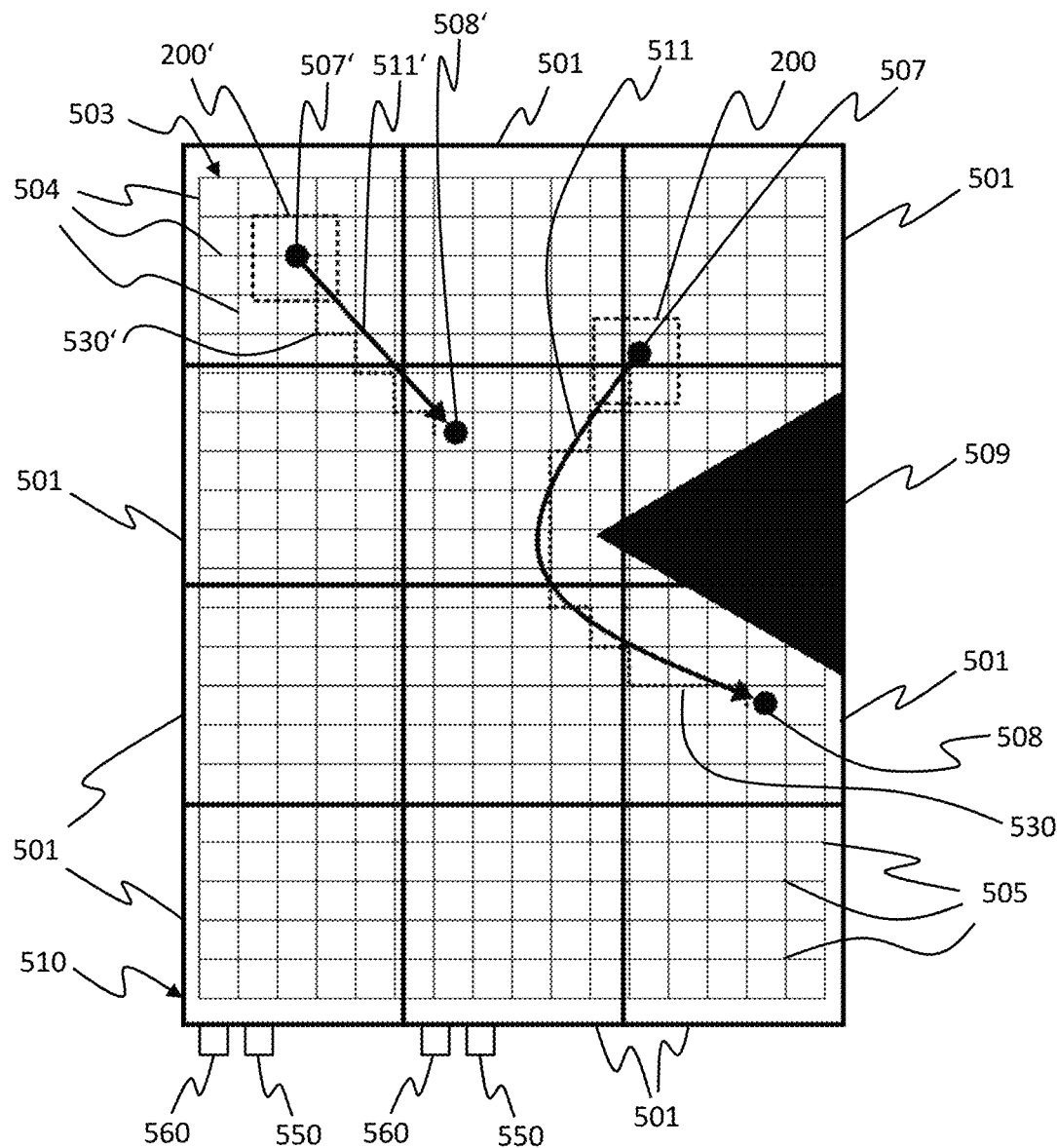
FIG. 11 shows a schematic depiction of the drive surface with another graph.

FIG. 11 shows a schematic view of a section of the drive surface 510 with a fictitious graph 503 according to FIG. 8. A mover 200 and another mover 200' are shown. The fictitious graph 503 has edges 504 and nodes 505 that form meshes with a rectangular pattern. A node 505 is arranged at intersection points of each edge 504.

The control unit 506 is embodied to perform path planning for the mover 200 to a target point 508 depending on a starting point 507. The starting point 507 may be the current position of the mover 200. Furthermore, depending on the chosen embodiment, the starting point 507 may also be predetermined independently of the current position of the mover 200. In the described embodiment example, the target point 508 is located in a mesh of the graph 503 in the lower right sector 501. The starting point 507 is assumed to be a node 505 near the center of the mover 200. In this example, the control unit first determines a preliminary path 530 from the starting point 507 to the target point 530 based on the edges and nodes. The preliminary path 530 is shown as a dashed line. After or during the determination of the preliminary path 530, the preliminary path 530 is smoothed into a path 511 according to predetermined rules, e.g. to prevent excessive changes in direction. For example, sections of the preliminary path 530 that have a radius of curvature below a predetermined threshold may be adjusted such that the radii of curvature are above the threshold.

Then, the control unit uses the smoothed path 511 for dynamic planning and for controlling the magnetic field generators of the sectors to move the mover 200 along the path 511 to the target point.

In addition, the further aspects of the method described with reference to FIG. 7 may also be used in this method. In particular, the edges 504 or at least portions of edges 504 between two nodes 505 may have weightings that are taken into account during path planning.

The control unit 506 is further embodied to execute further path planning to a further target point 508' for the further mover 200' depending on a further starting point 507'. The further starting point 507' is the current position of the further mover 200'. In the described embodiment example, the further target point 508' is located in a mesh of the graph 503 in a sector 501. The starting point 507 is assumed to be a node 505 near the center of the mover 200. In this example, the control unit first determines a preliminary further path 530' from the further starting point 507' to the further target point 530' based on the edges 504 and nodes 505. The preliminary further path 530' is indicated as a dashed line. After or during determination of the preliminary further path 530', the preliminary further path 530' is smoothed according to predetermined rules to form a further path 511'. For example, sections of the preliminary further path 530' may be smoothed to a straight line.

Subsequently, the control unit uses the smoothed further path 511' for dynamic planning and for actuating the magnetic field generators of the sectors to move the further mover 200' along the further path 511' to the further target point 508'.

In addition, the further aspects of the method described with reference to FIG. 7 may also be used in this method. In particular, edges 504 or at least portions of edges 504 between two nodes 505 may have weightings that are taken into account in path planning.

As explained earlier, path planning does not necessarily have to take place along the edges 504 and nodes 505, but may take place within a mesh of the rasterization of the graph 503 after appropriate smoothing. The finer the gridding of the graph 503, the finer the path planning. The preliminary paths 530, 530' determined based on the edges 504 with the staircase-like progression do not necessarily represent an optimal path.

In principle, it may be important for dynamic planning that the path has as few abrupt changes in direction as possible, i.e. corners, since any abrupt change in direction requires the mover to stop or slow down at that point. If the path runs exactly on the edges, such abrupt changes of direction often cannot be avoided. Therefore, it is often advantageous if the path deviates from the edges. For this purpose, two smoothing methods are e.g. provided:

A hybrid graph algorithm is used for path planning, which considers the graph in the planning, but at the same time already uses deviations from the edges to avoid corners. This is referred to as hybrid A* algorithm. A corresponding method is disclosed in "Application of Hybrid A to an autonomous mobile robot for planning in unstructured outdoor surrounding areas" by Janke Petereit et al.

In a first step, a pure graph algorithm may be used that plans a path exactly along the edges. In a further step, a smoothing procedure is then applied to the path, which essentially rounds off the corners of the path. For this, it is e.g. possible to specify how far the path generated in this way may deviate from the original path along the edges.

In another embodiment, a square grid with three differently gridded graphs, i.e. with three gradations, may be used. The graphs have edges with nodes forming grids with square grid structures, wherein the nodes define the intersection points of the grid structures. Each edge length of the three graphs is an integer divisor of the length of the sectors. The sectors have square shapes, with all sectors being of equal size. By this choice, the possible nodes of the grid structures of the three grids are at the same positions on each sector. This prevents possible hardware-induced variations of the available force on the mover as a function of the position on a sector have a different effect on the motion planning on different sectors.

A third graph is used for a close-range field that is directly adjacent to the mover and surrounds the mover. The third graph has a grid with a constant edge length of e.g. 1.2 mm. The length and width of the sectors is 240 mm. The third graph is used for path planning for an area up to 12 mm distance around the current position of the mover. The distance of 12 mm may correspond to the distance the mover is moved within three real-time cycles at a specified maximum speed. The third graph is needed, for example, to approach target points with high precision and to optimize the immediate upcoming movement in the next 2 to 3 time cycles.

A second graph is used for a center field, wherein the center field comprises the close-range field and a more distant area around the mover. The second graph has a grid with an edge length of e.g. 12 mm. The second graph is e.g. used for path planning in a range up to 120 mm away from the current position of the mover. The distance of 120 mm may correspond to the distance the mover is moved within 30 time cycles at a fixed maximum speed. The second graph may particularly be used to avoid collisions between movers and provide more precise path planning than for a far-range field for the next 30-100 time cycles, depending on the maximum speed of the mover.

A first graph for a far-range field is used, wherein the far-range field includes the center field and a more distant region. The first graph has a grid with edge lengths of 120 mm. The first graph may e.g. be used to perform path planning for an unlimited distance, i.e., up to the target point. For example, the first graph is used to find the shortest path from the current position of the mover to a target point, especially if the target point is far more than 120 mm away.

Depending on the chosen embodiment, more graphs may also be used with other grid structures for path planning of the movers.

The present invention was described in detail by preferred embodiment examples. However, it is not limited by the disclosed examples since a person skilled in the art may derive variations therefrom without exceeding the protective scope of the invention.

The advantageous embodiments and further embodiments of the present invention that have been described above and/or defined in the dependent claims may be put to use individually or in any desired combination with one another—except for in case of unambiguous dependencies and incompatible alternatives.

TABLE 1

List of references: 1-250

| | |
|---|---|
| 1 planar drive system | 200 mover |
| 8 top side | 200' further mover |
| 9 bottom side | 201 magnetic arrangement |
| 10 stator module | 206 first rotor direction |
| 11 stator surface | 208 second rotor direction |

TABLE 1-continued

List of references: 1-250

| | |
|---|---|
| 12 first direction | 210 first magnet unit |
| 14 second direction | 211 drive magnet |
| 15 vertical direction | 220 second magnet unit |
| 18 connecting line | 221 further drive magnet |
| 19 module housing | 230 third magnet unit |
| 30 outer edge of stator surface | 240 fourth magnet unit |
| 100 stator assembly | 250 second magnetic field generator |
| 104 first stator layer | |
| 105 second stator layer | |
| 106 third stator layer | |
| 107 fourth stator layer | |
| 110 first stator sector | |
| 112 third stator sector | |
| 113 second stator sector | |
| 114 fourth stator sector | |
| 120 first stator segments | |
| 121 second stator segments | |
| 125 conductor strips | |
| 126 further conductor strips | |
| 127 conductor paths | |

TABLE 2

List of references: 501-560

| | |
|---|---|
| 501 sector | 520 second graph |
| 503 graph | 521 second edges |
| 504 edge | 522 second nodes |
| 505 node | 523 first edges |
| 506 control unit | 524 first nodes |
| 507 starting point | 525 first path |
| 507' further starting point | 526 second path |
| 508 target point | 527 shared node |
| 508' further target point | 528 path of movement |
| 509 object | 530 preliminary path |
| 510 drive surface | 530' further preliminary path |
| 511 path | 535 intermediate target |
| 511' further path | 550 temperature sensor |
| 512 data memory | 560 position sensor |
| 513 further first mover | |
| 514 further second mover | |
| 515 surrounding area | |
| 516 second path section | |
| 517 first path section | |
| 518 bridge section | |
| 519 first graph | |

The invention claimed is:

1. A device for driving at least one mover on a drive surface, the device comprising at least first and second magnetic field generators,
   wherein the drive surface comprises a plurality of plate-shaped sectors, the sectors comprising the first magnetic field generators, the sectors being connected to a control unit, and
   wherein the control unit is configured to generate magnetic fields via a corresponding control of a power supply of the first magnetic field generators in such a way that the mover is movable in at least one direction over the drive surface,
   the control unit being embodied to carry out path planning for the mover, the control unit using at least one graph with nodes and edges for the path planning,
   the control unit being embodied to use the graph to generate a path for the mover from a starting point to a target point, and
   the control unit being embodied to actuate the first magnetic field generators with current in such a way that the mover is moveable over the drive surface along the determined path.

2. The device according to claim 1, wherein at least a portion of the edges is assigned a weighting, and
   wherein the control unit considers the weighting during path planning, and
   wherein the weighting of an edge depends on a length of the edge or on a maximum speed of the mover when traveling over the edge or at least on a temperature of the sector, or on a temperature of at least one of the first magnetic field generators of the sector.

3. The device according to claim 1, wherein the control unit uses a graph in path planning, which graph has a different density of edges and/or a different density of nodes and/or a different mean length of the edges depending on a distance to a center position of the mover.

4. The device according to claim 3, wherein the control unit uses a graph in path planning that has a greater density of edges and/or a greater density of nodes and/or a smaller mean length of edges in a predetermined surrounding area around the position of the mover than outside the surrounding area.

5. The device according to claim 3, wherein the control unit uses a graph in path planning having a smaller density of edges and/or a smaller density of nodes with an increasing distance from the center position of the mover.

6. The device according to claim 1, wherein the control unit repeatedly performs the path planning in predeterminable time cycles.

7. The device according to claim 1, wherein the control unit executes path planning in two planning levels,
   wherein in a first planning level a first path planning with at least one first graph is executed and a first path is determined,
   wherein in a second planning level a second path planning with at least one second graph is carried out and a second path is determined, wherein the first graph has a smaller density of nodes and/or edges than the second graph, and
   wherein the control unit takes both path plannings into account for the path planning of the mover.

8. The device according to claim 7, wherein the first graph and the second graph comprise at least one shared node, wherein the shared node that lies on the first path is taken into account by the control unit for the second path planning in the second planning level, and wherein the control unit uses the shared node located on the first path as a target for the second path planning.

9. The device according to claim 8, wherein the control unit pre-computes the first path planning with respect to the second path planning, so that the control unit is configured to take shared nodes located on the first path into account for the second path planning.

10. The device according to claim 1, wherein the control unit is configured to carry out dynamic planning for the acceleration and/or the speed of the mover on the basis of the planned path in order to correspondingly actuate the first magnetic field generators of said sectors that are necessary in accordance with the planned path.

11. A device for driving at least one mover on a drive surface, the device comprising at least first and second magnetic field generators,
    wherein the drive surface comprises a plurality of plate-shaped sectors, the sectors comprising the first magnetic field generators, the sectors being connected to a control unit,
    wherein the control unit is configured to generate magnetic fields via a corresponding control of a power supply of the first magnetic field generators of the sectors in such a way that the mover is movable in at least one direction over the drive surface, the control unit being embodied to carry out path planning for the mover from a starting point to a target point, and the control unit being embodied to actuate the first magnetic field generators of the sectors with current in such a way that the mover is movable over the drive surface along the determined path, wherein the control unit is embodied to use at least one graph having nodes and edges for path planning, and wherein in a predetermined surrounding area around the position of the mover the graph has a density of edges and/or nodes that is higher than said density outside of the surrounding area, and/or a mean length of the edges that is smaller than said mean length outside of the surrounding area.

12. The device according to claim 11, wherein at least a portion of the edges is assigned a weighting, and wherein the control unit considers the weighting during path planning, wherein the weighting of an edge depends on a length of the edge or on a maximum speed of the mover when traveling over the edge, and/or wherein the weighting depends at least on a temperature of the sector, or on a temperature of at least one of the first magnetic field generators of the sector.

13. The device according to claim 12, wherein the control unit executes path planning in two planning levels, wherein in a first planning level a first path planning with at least one first graph is executed and a first path is determined, wherein in a second planning level a second path planning with at least one second graph is carried out and a second path is determined, wherein the first graph has a smaller density of nodes and/or edges than the second graph, and wherein the control unit takes both path plannings into account for the path planning of the mover.

14. The device according to claim 11, wherein the first graph and the second graph comprise at least one shared node, wherein the shared node that lies on the first path is taken into account by the control unit for the second path planning in the second planning level, and wherein the control unit uses the shared node located on the first path as a target for the second path planning.

15. The device according to claim 11, wherein the control unit pre-computes the first path planning with respect to the second path planning, so that the control unit is configured to take shared nodes located on the first path into account for the second path planning.

16. A method for driving at least one mover, wherein the mover comprises at least one device for generating a magnetic field, the device comprising at least one magnet, wherein the mover is movable on a drive surface having a plurality of sectors, wherein the sectors have magnetic field generators for generating at least one magnetic field, wherein path planning for the mover is carried out from a starting point to a target point on the drive surface, and wherein at least one graph having nodes and edges is used for path planning, wherein in a predetermined surrounding area around the position of the mover the graph has a higher density of edges and/or a higher density of nodes that is higher than said density outside of the surrounding area, and/or a smaller mean length of the edges that is smaller than said mean length outside of the surrounding area.

17. The method according to claim 16, wherein at least a portion of the edges is assigned a weighting, wherein the weighting of the edge indicates how advantageous the edge is to path planning, and wherein path planning takes the weighting into account, wherein the weighting of the edge depends on a length of the edge or on a maximum possible speed of the mover when traveling over the edge, and/or wherein the weighting of the edge depends on at least a temperature of a sector over which the edge passes, or wherein the weighting depends on a temperature of at least one of the magnetic field generators of the sector.

18. The method according to claim 16, wherein the path planning is carried out in two planning levels, wherein in a first planning level a first path planning is carried out with a first graph and a first path is determined, wherein in a second planning level a second path planning is carried out with a second graph and a second path is determined, wherein the first graph has a smaller density of nodes and/or edges and/or a smaller mean length of the edges than the second graph, and wherein both path plannings are taken into account for the path planning of the mover.

19. The method according to claim 16, wherein the first graph and the second graph comprise at least one shared node, wherein a shared node located on the first path is taken into account for the second path planning in the second planning layer, and wherein the shared node located on the first path is used as a target for the second path planning.

20. The method according to claim 16, wherein the first path planning is calculated ahead of the second path planning, and wherein for the second path planning, shared nodes located on the determined first path are considered in the second path planning.

* * * * *